US012214861B2

(12) United States Patent
Granier et al.

(10) Patent No.: US 12,214,861 B2
(45) Date of Patent: Feb. 4, 2025

(54) AIRCRAFT RUDDER PEDAL FRAME

(71) Applicant: DASSAULT AVIATION, Paris (FR)

(72) Inventors: Eric Granier, Saint-Cloud (FR);
Vincent Mateus, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 17 days.

(21) Appl. No.: 18/118,125

(22) Filed: Mar. 6, 2023

(65) Prior Publication Data

US 2023/0278697 A1 Sep. 7, 2023

(30) Foreign Application Priority Data

Mar. 7, 2022 (FR) ..................................... 22 01930

(51) Int. Cl.
| | |
|---|---|
| *B64C 13/04* | (2006.01) |
| *B64C 13/06* | (2006.01) |
| *B64C 13/12* | (2006.01) |
| *B64C 13/50* | (2006.01) |

(52) U.S. Cl.
CPC ............ *B64C 13/044* (2018.01); *B64C 13/06* (2013.01); *B64C 13/12* (2013.01); *B64C 13/50* (2013.01)

(58) Field of Classification Search
CPC ........ B64C 13/044; B64C 13/06; B64C 13/12
See application file for complete search history.

(56) References Cited

U.S. PATENT DOCUMENTS

| | | | |
|---|---|---|---|
| 1,478,308 A | 12/1923 | Otto | |
| 10,377,468 B2 * | 8/2019 | Carner | ..................... B64C 13/12 |
| 10,399,667 B2 * | 9/2019 | Guering | ................ B64C 13/044 |
| 10,894,595 B1 | 1/2021 | Wright et al. | |
| 11,467,617 B1 * | 10/2022 | Voiles | ....................... B60T 7/06 |
| 2014/0131523 A1 * | 5/2014 | Carner | ................... B64C 13/044 |
| | | | 244/235 |
| 2017/0166296 A1 * | 6/2017 | Guering | ................... G05G 1/36 |
| 2017/0174324 A1 * | 6/2017 | Carner | ..................... B64C 13/12 |

FOREIGN PATENT DOCUMENTS

| | | |
|---|---|---|
| CN | 109407750 A | 3/2019 |
| WO | WO2016191071 A1 | 12/2016 |

OTHER PUBLICATIONS

Search Report for priority application FR 22 01930.

\* cited by examiner

*Primary Examiner* — Philip J Bonzell
(74) *Attorney, Agent, or Firm* — Davidson Kappel LLC

(57) ABSTRACT

An aircraft rudder pedal frame includes a base, a support framework and connection interfaces. Each connection interface is able to connect another part of the rudder pedal to the frame. The support framework connects each connection interface to the base. The support framework includes framework elements arranged in a lattice, at least one of the framework elements extending from each connection interface.

20 Claims, 10 Drawing Sheets

AIRCRAFT RUDDER PEDAL FRAME

The present disclosure relates to an aircraft rudder pedal frame.

BACKGROUND

In aeronautics, the rudder pedal is one of the main flight controls located in the aircraft cockpit. It usually comprises two pedals allowing the pilot to operate the aircraft rudder to control the aircraft on the yaw axis.

Some rudder pedals also allow the pilot to control braking of the aircraft.

However, the known rudder pedals, and in particular, if need be, the frames of these rudder pedals, do not allow an adaptability of the ergonomics for a wide range of size of the aircraft pilot.

Indeed, the adjustment travel of the pedal positions are limited. Moreover, in certain adjusted positions, the pedals can present an inclination and/or a height not suited to the morphology of certain sizes of feet of the pilot. This may cause difficulty for the pilot to reach the foot support area according to the functions sought.

SUMMARY

An aim of the present disclosure is then to provide a rudder pedal frame that can integrate the many functions of the rudder pedal, able to withstand the design and operating forces, light enough not to exceed the rudder pedal mass allowance, and sufficiently compact to meet the allocated footprint in the aircraft.

Furthermore, it would be advantageous if the frame could be easily mounted in the aircraft.

The present disclosure provides to a rudder pedal frame comprising a base, a support framework and connection interfaces, each connection interface being able to connect another part of the rudder pedal to the frame, the support framework connecting each connection interface to the base, the support framework comprising framework elements arranged in a lattice, at least one of the framework elements extending from each connection interface.

The frame according to the present disclosure may comprise one or more of the following features, taken alone or in any technically feasible combination:
- the lattice comprises nodes, at each of which at least two of the framework elements cooperate, each framework element extending along a guide from one of the nodes, one of the connecting interfaces or the base, to another of the nodes, another of the connecting interfaces or the base;
- the framework elements of the support framework comprise support framework elements and bracing framework elements; each support framework elements extending along the guide between two ends, and, for each connection interface, at least one of the support framework elements extending from the connection interface and transmitting the load of the connection interface to the base; each bracing framework elements cooperating with at least one of the supporting framing framework elements at a node arranged between the two ends of the supporting framework element;
- the lattice comprises two side half lattices, the side half lattices being respectively formed by a part of the framework elements and being arranged on either side of a longitudinal median plane of the frame, the side half lattices being laterally connected to each other by at least one of the bracing framework elements;
- the base comprises at least two half-bases, the two half-bases being separated and at a distance from each other, the half-bases being arranged on either side of a longitudinal median plane of the frame;
- at least 50%, preferably at least 75%, of the framework elements are elongated;
- the lattice comprises nodes at each of which at least two of the framework elements cooperate; and at least 50%, preferably at least 75%, of the nodes in the lattice are distributed according to a spatially symmetrical arrangement, the spatially symmetrical arrangement presenting a plane of symmetry which preferably corresponds to a longitudinal median plane of the frame;
- each connection interface is male or female, each connection interface being able to be inserted into a separate element or able to receive a separate element for connecting the part of the rudder pedal associated with the frame;
- each connection interface comprises at least one fixing region, the fixing region delimiting at least one reception hole for receiving a fixing member;
- the base, the connection interfaces and the support framework are formed in one piece, the whole of the base, the connection interfaces and the support framework being integrally made of a predetermined material and preferably being formed by superimposing layers of said predetermined material, the predetermined material advantageously being aluminum or an aluminum alloy;
- the connection interfaces comprise at least two pedal interfaces, each pedal interface corresponding to a connection interface of an articulated pedal support structure of the rudder pedal, the two pedal interfaces being arranged on either side of the longitudinal median plane of the frame;
- the connection interfaces comprise at least one sensor interface corresponding to a connection interface of a yaw acquisition system of the rudder pedal configured to generate an electrical signal representative of the displacement of the pedals of the rudder pedal relative to the frame; and, for at least one of the pedal interfaces, one of the framework elements preferably connects said pedal interface to the sensor interface by extending from said pedal interface to the sensor interface;
- the connection interfaces comprise at least one adjustment interface corresponding to a connection interface of a system for ergonomic adjustment of an operating position of the pedals of the rudder pedals;
- the adjustment interface protrudes out of the plumb line of the base; the adjustment interface being connected to the base by at least two support framework elements able to transmit to the base the load carried by the adjustment interface; and
- the support framework delimits a central functional passage, said central functional passage allowing the passage of at least one cylinder with a diameter greater than or equal to 100 mm.

Furthermore, the present disclosure provides a rudder pedal comprising a frame as described above.

Furthermore, the present disclosure provides an aircraft comprising a rudder pedal frame or a rudder pedal as described above.

The present disclosure also provides a method of manufacturing a frame as described above.

The manufacturing method preferably comprises a step of additive manufacturing of the support framework of the frame, advantageously by selective laser melting.

BRIEF SUMMARY OF THE DRAWINGS

The present disclosure will be better understood upon reading the following description, given only by way of example, and made with reference to the attached drawing, in which.

DETAILED DESCRIPTION

Figure 1:
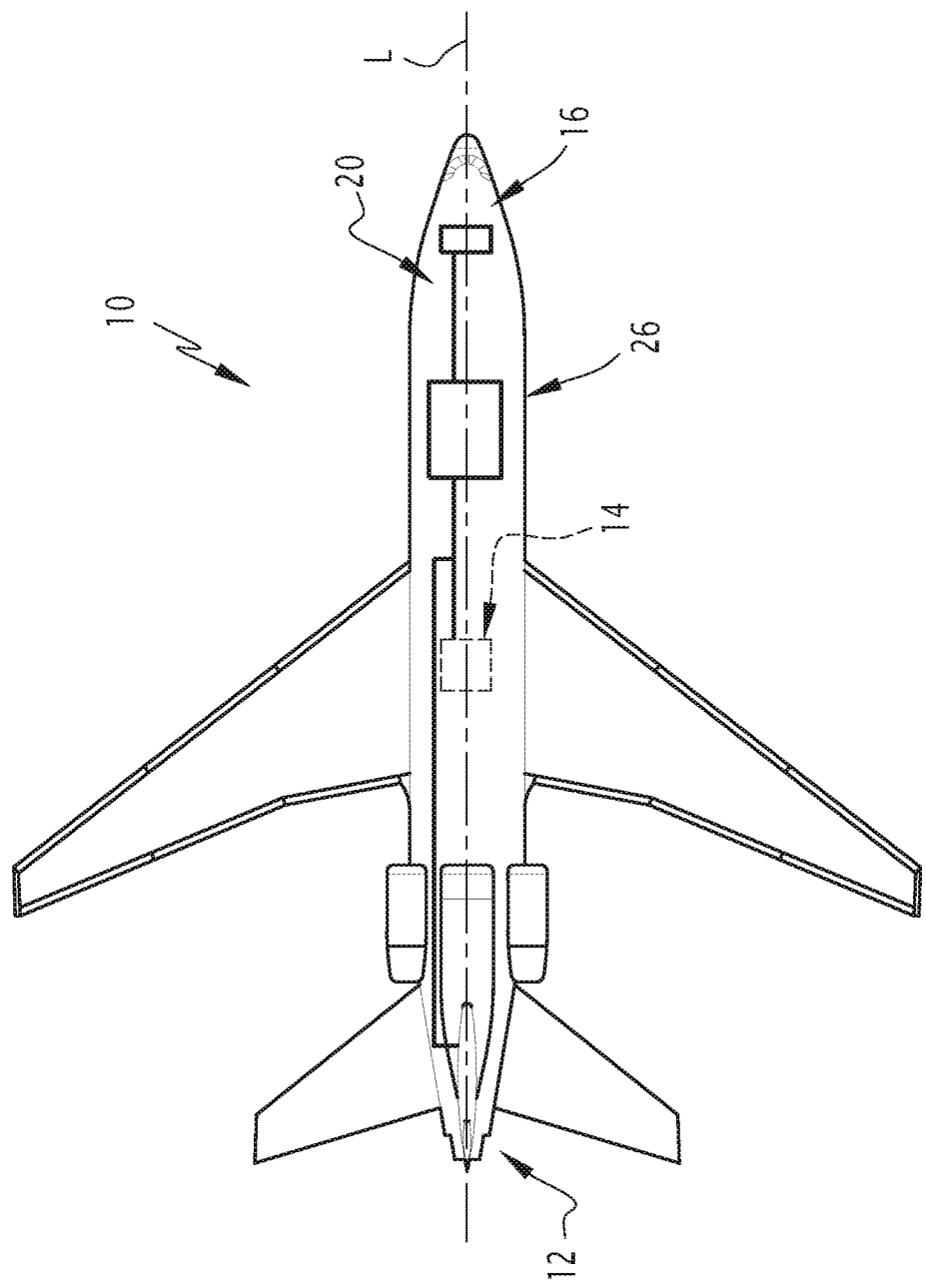
FIG. 1 is a schematic view of an example of an aircraft according to the present disclosure.

An example of an aircraft 10 is illustrated in FIG. 1.

The aircraft 10 includes at least one rudder 12, suitable for producing a yawing motion of the aircraft 10.

The aircraft 10 also comprises at least one landing gear 14 of the aircraft 10, the landing gear 14 comprising wheels and brakes suitable for braking said wheels.

Here and for the following, is defined:
- a longitudinal direction X1 which is parallel to a longitudinal axis L of the aircraft 10;
- a vertical direction Z1 which forms with the longitudinal direction X1 a vertical plane which is parallel to a vertical plane of symmetry of the aircraft 10, the vertical direction Z1 being orthogonal to the longitudinal direction X1; and
- a lateral direction Y1 that is orthogonal to said longitudinal direction X1 and vertical direction Z1.

The terms "rear" and "front" will then be understood relative to the longitudinal direction X1, namely for "front" toward the front of the aircraft 10 in the direction of a flight of the aircraft 10, and for "rear" toward the rear of the aircraft 10 in the direction opposite to the direction of a flight of the aircraft 10.

The aircraft 10 comprises a cockpit 16 preferably intended to accommodate at least two pilots. In particular, the cockpit 16 comprises a pilot seat for each pilot.

The aircraft 10 includes, for example, a display system comprising a screen, the screen preferably being arranged in the cockpit 16 for the pilots.

Figure 2:
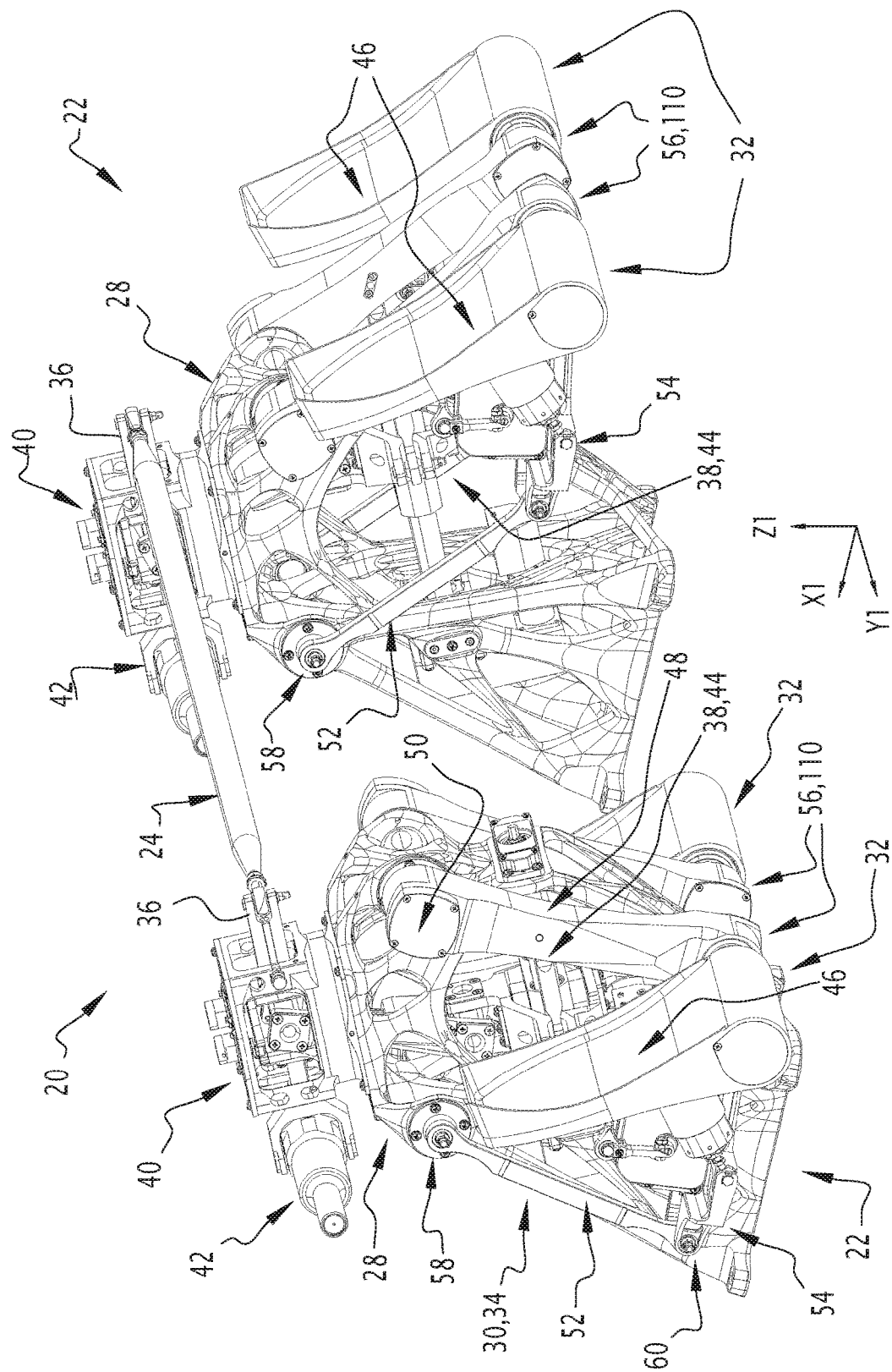
FIG. 2 is a perspective schematic view of an example of a control device of the aircraft of FIG. 1.

The aircraft 10 comprises a control device 20 illustrated in particular in FIG. 2.

The control device 20 comprises in this example at least two rudder pedals 22, and a main connecting rod 24 connecting the two rudder pedals 22.

The control device 20 preferably also comprises a processing unit 26 visible in FIG. 1, the processing unit 26 being able to implement the yaw angle and/or braking control functions.

Indeed, as will be described in more detail below, each rudder pedal 22 is preferably suitable to be actuated to allow the pilot to control the yaw angle of the aircraft 10 during a flight, in particular by controlling the rudder 12. In addition, each rudder pedal 22 is advantageously able to be actuated to allow the pilot to control the braking of the aircraft 10, when the wheels of the aircraft 10 are in contact with the ground, in particular by controlling the brakes of the landing gear 14.

Each rudder pedal 22 of the control device 20 is arranged in the cockpit 16 of the aircraft 10. In particular, each rudder pedal 22 is arranged opposite one of the seats so that the pilot seated in the seat can actuate the rudder pedal 22.

Each rudder pedal 22 comprises a frame 28, a preferred non-limiting embodiment of which will be described in more detail relative to FIGS. 9 and 10.

Each rudder pedal 22 comprises at least one pedal side system 30, each pedal side system 30 comprises a pedal 32 and an articulated support structure 34 connecting the pedal 32 to the frame 28.

Each rudder pedal 22 also comprises an output shaft 36, and a mechanical kinematic chain 38 for transmitting to the output shaft 36 a displacement of the pedals 32 relative to the frame 28, to transmit a yaw command from the pilot to the output shaft 36.

The output shafts 36 of the two rudders 22 are connected to each other via the main connecting rod 24.

Advantageously, each rudder pedal 22 also comprises a yaw acquisition system 40.

In addition, each rudder pedal 22 preferably comprises a yaw force restitution system 42.

Advantageously, each rudder pedal 22 also comprises an ergonomic adjustment system 44 for adjusting an operating position of the pedals 32 relative to the frame 28.

As shown above, each pedal side system 30 comprises the pedal 32 and the pedal articulated support structure 34 of the pedal 32.

Figure 3:
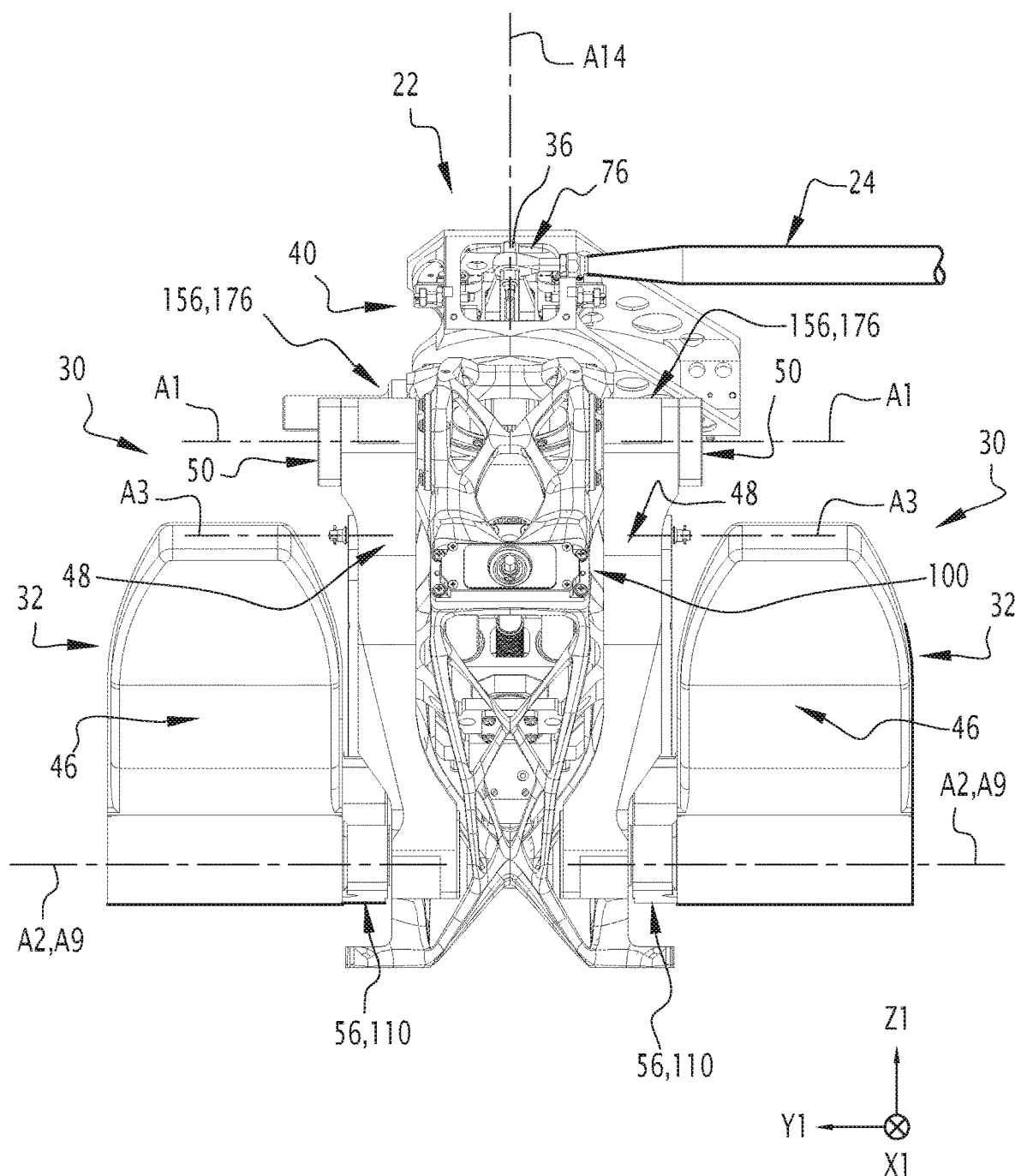
FIGS. 3 and 4 are front and side schematic views, respectively, of a rudder pedal of the control device of FIG. 2.
Figure 4:
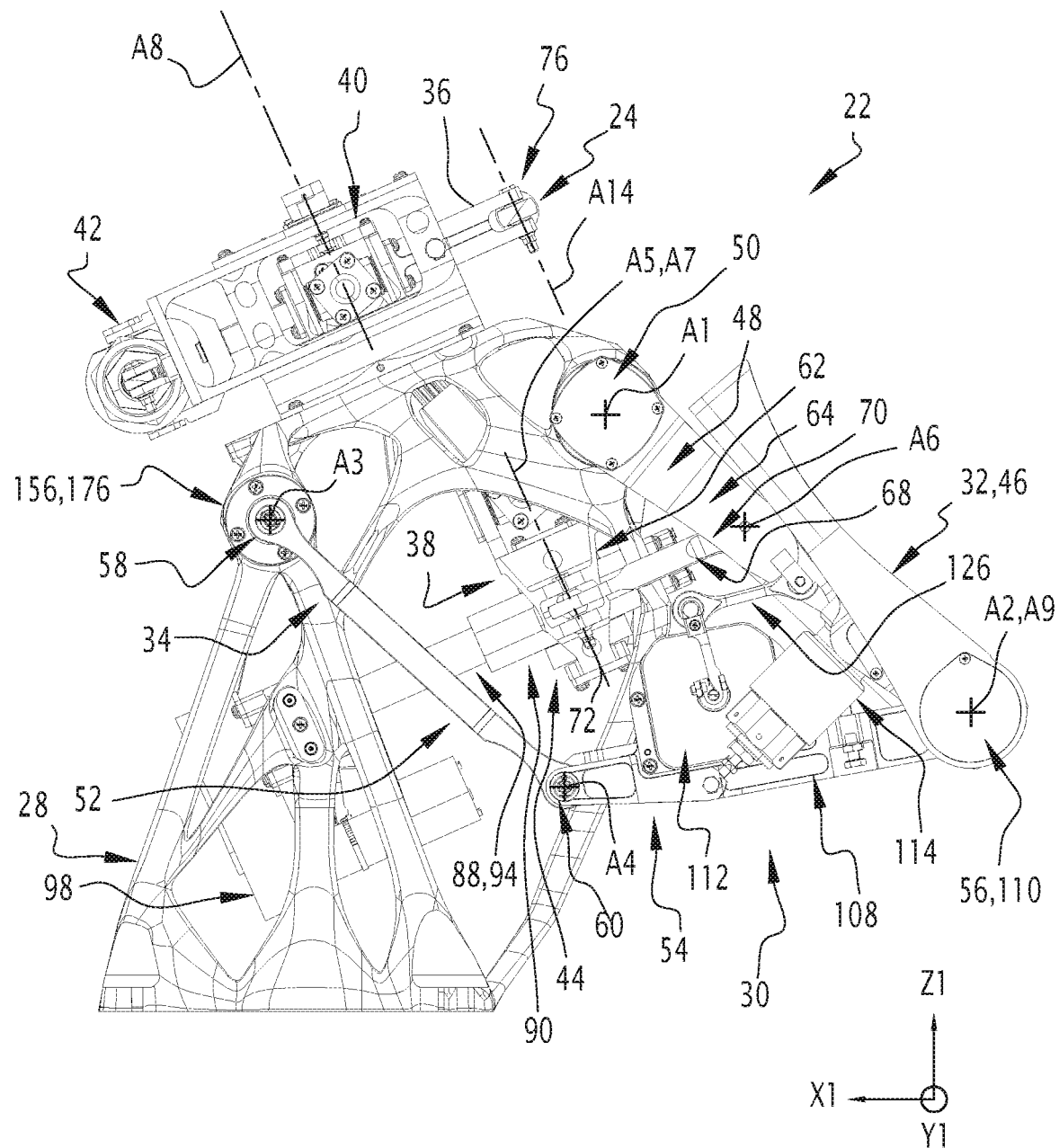

As illustrated in FIGS. 2 to 4, each rudder pedal 22 preferably comprises two pedal side systems 30. The articulated support structures 34 of the two pedal side systems 30 are then arranged on one side or the other of the frame 28.

Each pedal side system 30 will now be described in more detail.

The pedal 32 comprises at least one rest 46 for a foot of the pilot.

The pedal 32 has an outer contour surrounding the footrest 46.

As illustrated in FIG. 3, the footrest 46 is, for example, solid, whereby the surface area of the foot rest 46 corresponds to the entire area delimited by said outer contour. Alternatively, the footrest 46 is perforated.

Figure 5:
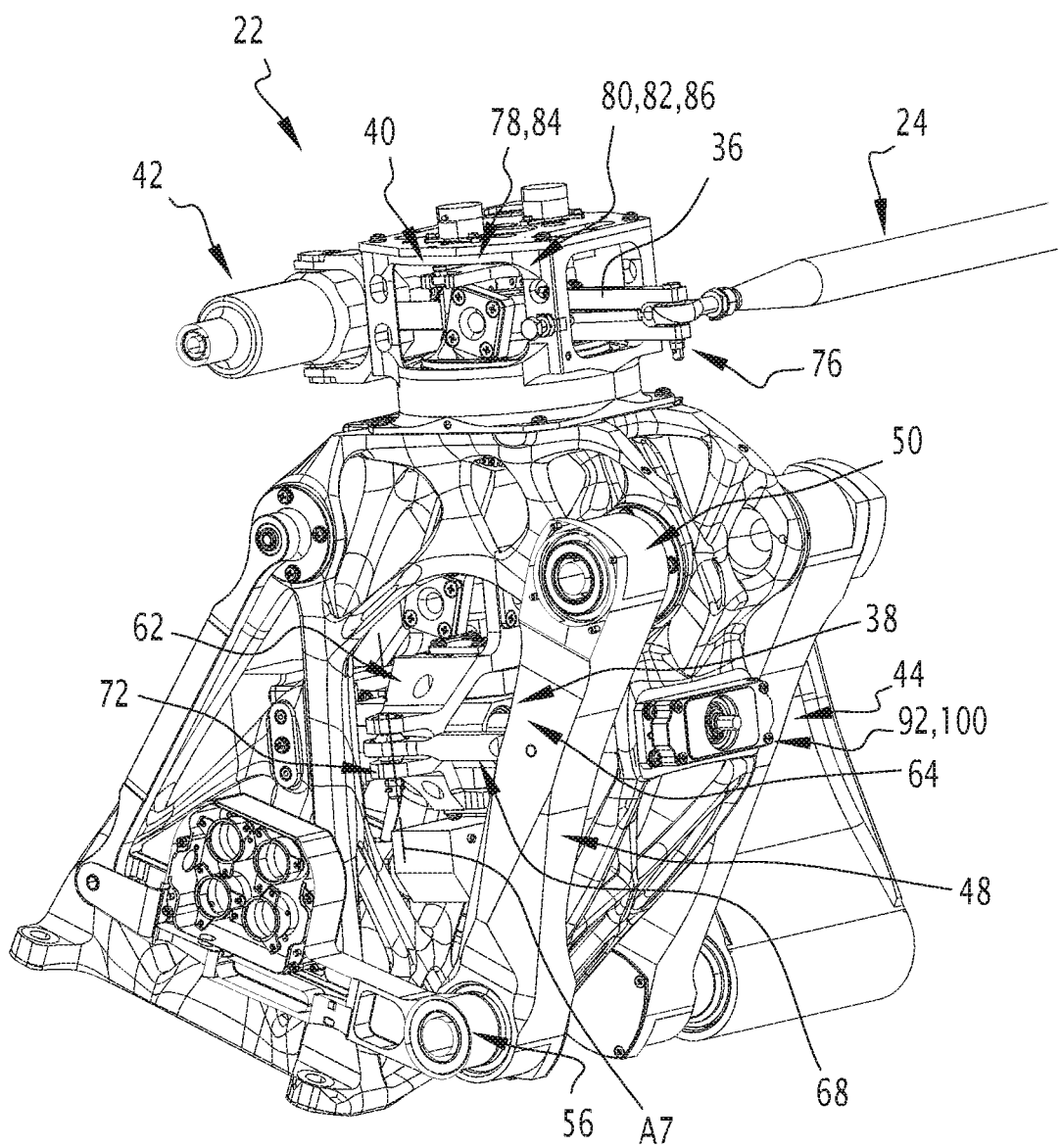
FIGS. 5 and 6 are perspective schematic sections of the rudder pedal.

As illustrated in FIGS. 3 to 5, the articulated support structure 34 of the pedal 32 includes at least one crank 48.

The displacement of the pedal 32 relative to the frame 28 is permitted at least by said crank 48.

Thus, the crank 48 presents on the one hand a first pivotal articulation connection 50 with the frame 28 and is connected on the other hand to the pedal 32. The connection of the crank 48 to the pedal 32 is preferably a braking pivot connection, as described in more detail below.

By "pivotal articulation connection between two members" is meant here and hereafter any system allowing freedom of rotation between the two members according to a single axis. In a non-limiting manner, such a system comprises, for example, a straight axis part around which one or more other parts of the system rotate, the straight axis part defining the axis of rotation of the connection. Such a system also additionally or alternatively comprises at least one roller bearing and/or at least one bearing.

By means of the first pivotal articulation connection 50, the crank 48 is able to be rotated relative to the frame 28 by a displacement of said pedal 32 relative to the frame 28. The rotation is then according to an axis of rotation A1 passing through the first pivotal articulation connection 50 of the crank 48 with the frame 28.

In particular, when the pilot presses on the pedal 32 to the right of the connection of the crank 48 to the pedal 32, the displacement of the pedal 32 jointly drives the crank 48 in rotation relative to the frame 28 according to the axis of rotation A1.

Such a joint displacement of the pedal 32 and the crank 48 relative to the frame 28 according to the axis of rotation A1 corresponds, for example, to a rotation of the foot of the pilot about his knee.

Such a joint displacement of the pedal 32 and the crank 48 relative to the frame 28 according to the axis of rotation A1 is intended to control the yaw angle, by means of the mechanical kinematic chain 38, the yaw acquisition system 40, and the processing unit 26 as explained in more detail later.

In the example of FIGS. 3 to 5, the crank 48 extends, between the first pivotal articulation connection 50 and the connection to the pedal 32, along a guide curve. Preferably, the guide curve is straight, when viewed projected onto a plane perpendicular to the axis of rotation A1. Alternatively, this guide curve is curved when viewed projected on a plane perpendicular to the axis of rotation A1, the crank 48 being, in other words, curved.

In one preferred embodiment of the present disclosure, the articulated support structure 34 of the pedal 32 further comprises a lever 52 and a support link 54.

The displacement of the pedal 32 relative to the frame 28 about the axis of rotation A1 is then allowed, at least by the assembly formed by the crank 48, the support link 54 and the lever 52, when the pilot presses the pedal 32.

In this example, the crank 48 presents a second pivotal articulation connection 56 with the support link 54.

In other words, the crank 48 is able to be rotated relative to the support link 54 about an axis of rotation A2 passing through the second pivotal articulation connection 56 of the crank 48 with the support link 54.

The axis of rotation A1 of the crank 48 relative to the frame 28 is parallel to the axis of rotation A2 of the crank 48 relative to the support link 54.

The distance between the axis of rotation A1 of the crank 48 relative to the frame 28 and the axis of rotation A2 of the crank 48 relative to the support link 54 remains constant during any displacement of the pedal 32 relative to the frame 28. For example, the crank 48 is thus rigid and non-deformable.

The lever 52 presents a first pivotal articulation connection 58 with the frame 28 and a second pivotal articulation connection 60 with the support link 54.

In other words, the lever 52 is able to be rotated relative to the frame 28 about an axis of rotation A3 passing through the first pivotal articulation connection 58 of the lever 52 with the frame 28. In addition, the lever 52 is able to be rotated relative to the support link 54 about an axis of rotation A4 passing through the second pivotal articulation connection 60 of the lever 52 with the support link 54.

The axis of rotation A3 of the lever 52 relative to the frame 28 is parallel to the axis of rotation A4 of the lever 52 relative to the support link 54.

Furthermore, the axis of rotation A3 of the lever 52 relative to the frame 28 is parallel to the axis of rotation A1 of the crank 48 relative to the frame 28.

The distance between the axis of rotation A3 of the lever 52 relative to the frame 28 and the axis of rotation A4 of the lever 52 relative to the support link 54 remains constant during any displacement of the pedal 32 relative to the frame 28. For example, the lever 52 is thus rigid and non-deformable.

In the example shown in FIG. 4, the lever 52 extends, between the first pivotal articulation connection 58 with the frame 28 and the second pivotal articulation connection 60 with the support link 54, along a guiding curve. Preferably, the guiding curve is straight, when viewed projected onto a plane perpendicular to the axis of rotation A1. Alternatively, this guiding curve is curved when projected onto a plane perpendicular to the axis of rotation A1, the lever 52 being, in other words, curved.

The support link 54 extends at least from the crank 48 to the lever 52.

The axis of rotation A4 of the lever 52 relative to the support link 54 is parallel to the axis of rotation A2 of the crank 48 relative to the support link 54.

The distance between the axis of rotation A2 of the crank 48 relative to the support link 54 and the axis of rotation A4 of the lever 52 relative to the support link 54 remains constant during any displacement of the pedal 32 relative to the frame 28. For example, the support link 54 is thus rigid and non-deformable.

Thus, when the pilot presses the pedal 32 to the right of the connection of the crank 48 to the pedal 32, the displacement of the pedal 32 jointly drives the crank 48 in rotation relative to the frame 28 according to the axis of rotation A1, as well as the lever 52 in rotation relative to the frame 28 according to the axis of rotation A3, by means of the support link 54.

Preferably, the crank 48 and the lever 52 form a kinematic trapezoid.

More specifically, the straight line passing through the first pivotal articulation connection 50 of the crank 48 with the frame 28 and through the second pivotal articulation connection 56 of the crank 48 with the support link 54 is substantially parallel to the straight line passing through the first pivotal articulation connection 58 of the lever 52 with the frame 28 and through the second pivotal articulation connection 60 of the lever 52 with the support link 54.

A "straight line through the pivotal articulation connection" is defined as a straight line through the axis of rotation associated with this pivotal articulation connection.

This parallelism is maintained during any displacement of the pedal 32 relative to the frame 28.

In the preferred example, the distance between the axis of rotation A1 of the crank 48 relative to the frame 28 and the axis of rotation A2 of the crank 48 relative to the support link 54 is different from the distance between the axis of rotation A3 of the lever 52 relative to the frame 28 and the axis of rotation A4 of the lever 52 relative to the support link 54.

Specifically, the distance between the axis of rotation A1 and the axis of rotation A2 is greater than the distance between the axis of rotation A3 and the axis of rotation A4, for example, at least 5 mm greater than the distance between the axis of rotation A3 and the axis of rotation A4.

As will be explained later, the use of the kinematic trapezoid with a difference in length between the crank 48 and the lever 52 allows for a slight variation in the angle of the pedal when ergonomically adjusting the rudder pedal. It results in a good ergonomic evolution of the angle imposed on the ankle of the pilot. This evolution of the angle responds to an ergonomic constraint which aims at not reaching extreme angles of the ankle which are uncomfortable for the pilot.

In the illustrated example, the articulated support structure 34 of the pedal 32 has no other crank or lever connected to the frame 28 and allows the rotation of the pedal 32 relative to the frame 28 around the axis of rotation A1, in other words, moving together with the pedal 32 during such a rotation.

The mechanical kinematic chain 38 for transmitting a displacement of the pedals 32 relative to the frame 28 will now be described.

By "mechanical kinematic chain" is meant an assembly of parts connected to each other, the assembly being able to transmit and/or transform a movement, the parts comprising, for example, at least those described below.

Figure 6:
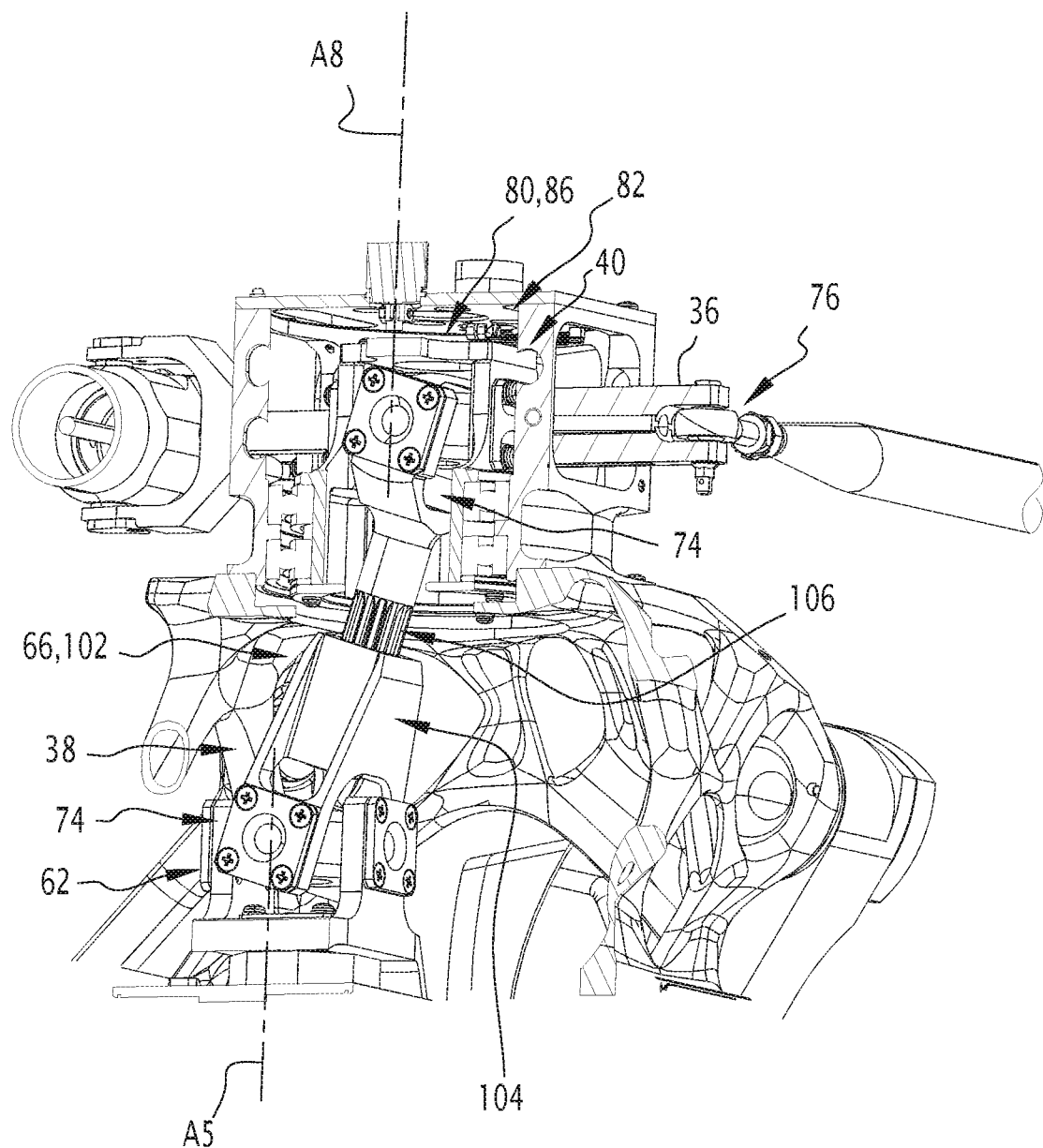

Generally speaking, as illustrated in FIGS. 4 to 6, the mechanical kinematic chain 38 comprises at least one central transmission part 62.

The mechanical kinematic chain 38 comprises, for each pedal 32, a transformation mechanism 64 for a displacement of the pedal 32 relative to the frame 28 into rotation of the central transmission part 62 relative to the frame 28.

The mechanical kinematic chain 38 also comprises a transmission mechanism 66 joining the central transmission part 62 to the output shaft 36.

The central transmission part 62 is able to be rotated, according to an axis of rotation A5, relative to the frame 28 by a displacement of the pedals 32 relative to the frame 28, this displacement being here the rotation of the pedals 32 relative to the frame 28 about the respective axes A1.

The central transmission part 62 is able to be rotated relative to the frame 28 according to the axis A5 by the two transformation mechanisms 64 that will now be described.

Any mechanism could be suitable as long as the central transmission part 62 can be rotated relative to the frame 28 according to the axis A5 by a displacement of the pedals 32 relative to the frame 28 about the respective axes A1.

The transformation mechanisms 64 are preferably symmetrical the one from the other relative to a median plane of the frame 28. The median plane of the frame 28 here passes through the longitudinal direction X1 and the vertical direction Z1.

In a preferred example of one embodiment, for each pedal 32, the transformation mechanism 64 comprises at least said crank 48 of the pedal side system 30 and an intermediate link 68.

The intermediate link 68 in this example ensures the connection between the central transmission part 62 and the crank 48.

Thus, the intermediate link 68 presents a first point of articulation 70 with the crank 48 and a second point of articulation 72 with the central transmission part 62.

Here and hereafter, each articulation point is a pivotal articulation connection as defined above or a ball and socket connection.

In other words, the intermediate link 68 is able to be rotated relative to the crank 48 about an axis of rotation A6 passing through the first point of articulation 70 of the intermediate link 68 with the crank 48. In addition, the intermediate link 68 is able to be rotated relative to the central transmission part 62 about an axis of rotation A7 passing through the second point of articulation 72 of the intermediate link 68 with the central transmission part 62.

The distance between the axis of rotation A6 of the intermediate link 68 relative to the crank 48 and the axis of rotation A7 of the intermediate link 68 relative to the central transmission part 62 remains constant during any displacement of the pedal 32 relative to the frame 28.

For example, the intermediate link 68 is thus rigid and non-deformable. The intermediate link is preferably one-piece.

The first point of articulation 70 of the intermediate link 68 with the crank 48 is away from the first pivotal articulation connection 50 of the crank 48 with the frame 28, and preferably away from the connection of the crank 48 with the pedal 32.

In particular, as illustrated in FIG. 4, the first point of articulation 70 of the intermediate link 68 with the crank 48 is arranged between the first pivotal articulation connection 50 of the crank 48 with the frame 28 and the connection of the crank 48 with the pedal 32.

In the example shown in FIG. 4, the axis of rotation A6 passing through the first point of articulation 70 of the intermediate link 68 with the crank 48 extends non-parallel to the axis of rotation A7 passing through the second point of articulation 72 of the intermediate link 68 with the central transmission part 62.

Preferably, the axis of rotation A7 passing through the second point of articulation 72 of the intermediate link 68 with the central transmission part 62 is parallel to the axis of rotation A5 of the central transmission part 62 relative to the frame 28.

For example, at the second point of articulation 72, the central transmission part 62 comprises a fork and the intermediate link 68 presents a connecting end. The fork and the connecting end then form said second point of articulation 72 of the intermediate link 68 with the central transmission part 62.

Thus, when the crank 48 of the transformation mechanism 64 is rotated relative to the frame 28 according to the axis A1, the rotation of the crank 48 moves the intermediate link 68 of the transformation mechanism 64 relative to the frame 28, and the displacement of the intermediate link 68 rotates the central transmission part 62 relative to the frame 28 according to the axis A5.

This rotation of the central transmission part 62 relative to the frame 28 according to the axis A5 is driven whether the pilot presses on one or the other of the pedals 32.

In one preferred embodiment, the mechanical kinematic chain 38 is able to generate displacements of the pedals 32 relative to the frame 28, according to the respective axes A1, which are antagonistic to each other.

In other words, the mechanical kinematic chain 38 is such that the rotation of one of the pedals 32 relative to the frame 28 according to a first direction of rotation about its axis A1 causes an opposite rotation of the other of the pedals 32 relative to the frame 28 in a second direction of rotation opposite to the first direction of rotation, when the directions of rotation are seen from the same side.

Indeed, the rotation of the central transmission part 62 according to the axis of rotation A5, caused by one of the transformation mechanisms 64, drives the other of the transformation mechanisms 64 and therefore the associated pedal 32 in an opposite manner.

Thus, the two intermediate links 68 are located on either side of the central transmission part 62.

More specifically, the rotation of the central piece relative to the frame 28 according to the axis of rotation A5, caused by the intermediate link 68 of one of the transformation mechanisms 64, antagonistically displaces the intermediate link 68 of the other of the transformation mechanisms 64, and therefore the associated crank 48 and pedal 32.

The mechanical kinematic chain 38 is able to transmit, to the output shaft 36, the rotation of the central transmission part 62 relative to the frame 28 according to the axis of rotation A5, this by means of the transmission mechanism 66.

The transmission mechanism 66 comprises at least one homokinetic association of two universal joints 74 between said central transmission part 62 and the output shaft 36.

By "universal joint" is meant a connection system that allows the transmission of angular rotation from one part to another part, the axes of rotation of the parts being concurrent.

More precisely, the output shaft 36 is able to be rotated relative to the frame 28 according to an axis of rotation A8 parallel to the axis of rotation A5 of the central part relative to the frame 28.

By the homokinetic association of the two universal joints 74, the speed of rotation of the central transmission part 62 relative to the frame 28 according to the axis of rotation A5 is equal, at each instant, to the speed of rotation of the output shaft 36 relative to the frame 28 according to the axis of rotation A8.

Thus, when the crank 48 of the transformation mechanism 64 is rotated relative to the frame 28 according to the axis A1, the rotation of the crank 48 displaces the intermediate link 68 of the transformation mechanism 64 relative to the frame 28, the displacement of the intermediate link 68 rotates the central transmission part 62 relative to the frame 28 according to the axis A5, and the transmission mechanism 66 transmits the rotation of the central part to the output shaft 36 relative to the frame 28 according to the axis A8.

The two rudder pedals 22 are connected to each other by means of the main connecting rod 24 such that the relative positions of the pedals 32 of one of the rudder pedals 22 simultaneously reflect the relative positions of the pedals 32 of the other of the rudder pedals 22.

Generally, the main connecting rod 24 is arranged above the pedals 32, and above the frame 28, projecting in the vertical direction Z1. In addition, the main connecting rod 24 is arranged in a proximal manner relative to the rudder pedal 22.

The mounting of the main connecting rod 24 is thus facilitated by its particular arrangement.

In the preferred embodiment, the connection of the output shafts 36 by the main connecting rod 24 is such that a displacement of the pedals 32 relative to the frame 28 of one of the rudder pedals 22 is transmitted to the pedals 32 of the other of the rudder pedals 22.

To this end, in the embodiment illustrated in FIG. 2, the main connecting rod 24 is able to transmit the rotation of the output shaft 36 relative to the frame 28 according to the axis A8 of one of the rudder pedals 22 into rotation, in the same direction, of the output shaft 36 relative to the frame 28 according to the axis A8 of the other of the rudder pedals 22.

For this purpose, the main connecting rod 24 is connected on both sides to the output shafts 36 of both rudder pedals 22.

Preferably, the main connecting rod 24 presents a pivotal articulation connection 76 to each output shaft 36 of the rudder pedals 22.

In other words, for each output shaft 36 of the rudder pedals 22, the main connecting rod 24 is able to be rotated relative to the output shaft 36 about an axis of transmission A14 passing through the pivotal articulation connection 76 of the main connecting rod 24 with that output shaft 36.

In the example in FIG. 2, the two axes of transmission A14 are parallel to each other.

The axes of transmission A14 are parallel to the respective axes of rotation A9 of the output shafts 36 relative to the frames 28.

Thus, when one of the pilots presses one of the pedals 32 of a first rudder pedal 22, the joint rotation of the pedal 32 and the crank 48 relative to the frame 28 according to the axis A1 is transformed by the first rudder pedal 22 into rotation of the output shaft 36 relative to the frame 28 according to the axis A8 of this first rudder pedal 22, the main connecting rod 24 transmits this rotation into rotation of the output shaft 36 relative to the frame 28 according to the axis A8 of the second rudder pedal 22, which is transformed by the second rudder pedal 22 into rotation of the pedals 32 relative to the frame 28 of this second rudder pedal 22.

In parallel with the connection of the two rudder pedals 22 by the output shafts 36 and the main connecting rod 24, it is also possible for each rudder pedal 22 to independently measure a yaw angle command from the rotation of the output shaft 36 relative to the frame 28 according to the axis A8, and to exert an artificial force against the displacement of the pedals 32 relative to the frame 28 in order to restore a force related to the yaw angle command.

The yaw acquisition system 40 is supported by the frame 28.

Thus, each rudder pedal 22 carries its own yaw acquisition system 40, which allows a redundancy of the yaw control, and to avoid depending on a central acquisition station common to both rudder pedals 22. The safety is improved.

The yaw acquisition system 40 is configured to generate an electrical signal representative of the displacement of the pedals 32 relative to the frame 28.

In the illustrated embodiment, the yaw acquisition system 40 is configured to generate an electrical signal representative of the rotation of the pedals 32 relative to the frame 28, according to the respective axes of rotation A1.

Generally, the yaw acquisition system 40 is configured to generate said signal from a measurement of displacement of any of the parts of the mechanical kinematic chain 38 relative to the frame 28.

In the illustrated example, the yaw acquisition system 40 is in particular configured to generate said electrical signal from a measurement of the rotation of the output shaft 36 relative to the frame 28 according to the axis of rotation A8.

To do so, the yaw acquisition system 40 comprises at least one acquisition sensor 78.

In the preferred embodiment shown in FIG. 5, the yaw acquisition system 40 comprises at least two redundant acquisition sensors 78, and a joint drive device 80 for the acquisition sensors 78.

Preferably, the yaw acquisition system 40 further comprises a system 82 for disabling the acquisition sensors 78 that presents the same features as those described below for the braking acquisition system 112.

Each acquisition sensor 78 comprises a fixed element and a movable element, the movable element being able to be displaced relative to the fixed element.

Each fixed element is fixed relative to the frame 28.

In particular, each acquisition sensor 78 comprises a roller 84 integral with the movable element.

The acquisition sensors 78 are preferably rotatable.

Each acquisition sensor 78 is able to generate an electrical measurement signal as a function of the position of the movable element relative to the fixed element over a useful electrical measurement travel.

The joint drive device 80 is able to displace, for each acquisition sensor 78, the movable element relative to the fixed element of the acquisition sensor 78.

The acquisition sensors 78 are advantageously resistive sensors, for example potentiometers, the fixed element then comprising a resistive track and the movable element then comprising a slider.

Throughout the following, the term "potentiometer" will be used to refer to each acquisition sensor 78 of the yaw acquisition system 40, the term "track" will be used to refer to the fixed element of each sensor 78, and the term "slider" will be used to refer to the movable element of each sensor 78. However, it is understood that the acquisition sensors 78 may be any type of sensor, other than a potentiometer, preferably any type of rotary sensor, for example any type of resistive or inductive sensor.

The joint drive device 80 is able to simultaneously move the sliders relative to the respective tracks by the same relative displacement.

The joint drive device 80 is able to transform a displacement of the output shaft 36 relative to the frame 28 according to the axis A8 into a joint displacement of the sliders relative to the respective tracks.

For this purpose, the joint drive device 80 preferably comprises a joint drive frame 86 for the rollers 84 of the potentiometers 78.

The drive frame 86 is then movable relative to the tracks of the potentiometers 78 and delimits, for each roller 84, a reception housing receiving the roller 84.

The reception housing is here an open groove.

In particular, the drive frame 86 comprises a fork for each roller 84, the fork delimiting said roller 84 reception housing.

In the preferred example where the potentiometers 78 are rotatable, the drive frame 86 is able to be displaced in rotation relative to the tracks of the potentiometers 78 about a predetermined axis of rotation.

The predetermined axis of rotation of the drive frame 86 relative to the tracks passes through a geometric center of the drive frame 86, the geometric center being located at the same distance from each roller 84.

The drive frame 86 is able to be displaced in rotation relative to the tracks in conjunction with the rotation of the output shaft 36 relative to the frame 28 according to the axis A8.

Preferably, the drive frame 86 is integral with the output shaft 36.

Thus, upon rotation of the output shaft 36 relative to the frame 28 according to the axis A8, the output shaft 36 drives in rotation the drive frame 86 and therefore each slider relative to the associated track.

For each redundant potentiometer 78, an electrical measurement signal is generated in parallel.

By "parallel generated measurement signals" or "parallel measurement signals" is meant signals generated by each of the redundant potentiometers 78 for the same relative displacement of the sliders by the joint drive device 80.

A yaw angle control can then be developed from these parallel measurement signals.

In the preferred embodiment, the processing unit 26 of the control device 20 is able to implement the yaw angle control function.

The processing unit 26 comprises, for example, a computer processing device and a memory.

The computer processing device is operatively connected to the memory.

The computer processing device corresponds to, for example, a digital signal processor (DSP), a microcontroller, a programmable cell array (FPGA), and/or a dedicated integrated circuit (ASIC) able to perform various data processing operations and functions.

For example, the computer processing device comprises a single processor. Alternatively, the computer processing device comprises several processors, which are located in the same geographical area, or are, at least partially, located in different geographical areas and are then able to communicate with each other.

By the term "memory" is meant any volatile or non-volatile computer memory appropriate to the presently disclosed subject matter, such as random access memory (RAM), read-only memory (ROM), or other electronic, optical, magnetic, or other computer-readable storage medium on which the data and control functions as described herein are stored.

Therefore, the memory is a tangible storage medium where the data and control functions are stored in a non-transitory form.

The processing unit 26 is connected to the yaw acquisition system 40 and to the or each rudder 12 of the aircraft 10.

For ease of clarity, the various wiring, particularly electrical, has not been illustrated in the figures.

The processing unit 26 is configured to receive each measurement signal from the yaw acquisition system 40.

More specifically, in the preferred example embodiment, the processing unit 26 is configured to receive the measurement signals generated in parallel by the acquisition sensors 78 of the yaw acquisition system 40.

The processing unit 26 is configured to generate a yaw angle control signal at least from each measurement signal received from the yaw acquisition system 40, and in particular from the parallel measurement signals.

The generation is implemented from, for example, a yaw control law, stored in the memory of the processing unit 26.

The processing unit 26 is then configured to send the developed yaw angle control signal to the or each rudder 12 of the aircraft 10.

The yaw force restitution system 42 is able to exert an opposing force against a pilot-initiated displacement of the pedals 32 relative to the frame 28 according to their respective axes A1.

The yaw force restitution system 42 is supported by the frame 28.

Generally, the yaw force restitution system 42 is configured to exert said opposing force against the displacement of any one of the parts of the mechanical kinematic chain 38 relative to the frame 28.

The yaw force restitution system 42 defines a rest position of the pedals 32 relative to the frame 28 according to their respective axes of rotation A1, the rest position being that adopted by the pedals 32 in the absence of force exerted by the pilot.

In a preferred embodiment, the opposing force exerted by the yaw force restitution system 42 presents a behavioral law that is at least proportional to the deflection of the pedals relative to the rest position, the coefficient of proportionality corresponding to an equivalent stiffness of the yaw force restitution system 42.

In a preferred embodiment, the opposing force exerted by the yaw force restitution system 42 is preferably double-sloped.

The equivalent stiffness is then a function of the pedal travel relative to the rest position. The equivalent stiffness presents at least a first constant value, until the pedals reach a predetermined travel, and a second distinct constant value beyond the predetermined travel.

The second value is, for example, strictly less than the first value.

In the illustrated embodiment, the yaw force restitution system 42 comprises at least one force member and a force shaft.

The force member comprises, for example, a spring.

The force member is able to exert said opposing force on the force shaft, the force shaft being joined to any one of the parts of the mechanical kinematic chain 38.

In the preferred embodiment illustrated, the yaw force restitution system 42 is in particular configured to exert said opposing force against the rotation of the output shaft 36 relative to the frame 28 according to the axis A8.

The force shaft is then, for example, joined to one of the two universal joints 74 of the mechanical kinematic chain 38.

In the example in FIG. 5, the force shaft is formed by the output shaft 36.

In particular, the output shaft 36 here extends on either side of the associated universal joint 74, with one side of the output shaft 36 forming the force shaft, and the other side being connected to the main connecting rod 24.

The ergonomic adjustment system 44 for an operating position of the pedals 32 relative to the frame 28 will now be described.

The term "pedal operating position" is defined, for example, by the position of the connection point of each pedal 32 to the associated crank 48 in projection onto a median plane of the frame 28, when the pedals 32 are arranged symmetrically relative to the median plane of the frame 28. Indeed, when the pedals 32 are thus arranged symmetrically in this manner, the two connection points of each pedal 32 to the crank 48 are superimposed in projection in the median plane of the frame 28.

Each of these connection points corresponds substantially to the position of the heel of one of the feet of the pilot in space.

The position of use of the pedals 32 relative to the frame 28 preferably corresponds to the rest position defined by the yaw force restitution system 42.

The ergonomic adjustment system 44 is able to move the operating position of the pedals 32 forward or backward relative to the seat of the pilot. The ergonomic adjustment system 44 is thus able to provide the most ergonomic operating position of the pedals 32 for any type of pilot.

The ergonomic adjustment system 44 thus defines an extreme distal operating position and an extreme proximal operating position between which the operating position of the pedals 32 can be locked.

Here and hereafter, the terms "distal" and "proximal" will be understood relative to the pilot operating the rudder pedal. Specifically, a "proximal" element is understood to be closer to the pilot than a "distal" element.

In particular, when the rudder pedal 22 is installed in the aircraft 10, then the terms "distal" and "proximal" are synonymous with "front" and "back" respectively.

The adjustment travel allowed by the ergonomic adjustment system 44 is at least 100 mm. In particular, the adjustment travel is the distance between the distal end use position and the proximal end use position.

In general, the ergonomic adjustment system 44 is able to jointly displace each pedal 32, in particular for moving the operating position forward or backward relative to the seat of the pilot.

More specifically, the ergonomic adjustment system 44 is able to jointly displace each pedal 32 in a plane perpendicular to the respective axes of rotation A1 of the cranks 48 relative to the frame 28.

To this end, in one preferred embodiment, the ergonomic adjustment system 44 comprises a slide 88 fixed relative to the frame 28 and a carriage 90.

Preferably, the ergonomic adjustment system 44 also comprises a device 92 for displacing and locking the carriage 90 to the slide 88.

The carriage 90 is able to be displaced on the slide 88 along an adjustment direction and is able to be locked in position on the slide 88.

The adjustment direction is inscribed in a plane passing through the longitudinal direction X1 and the vertical direction Z1. This plane is in particular a median plane of the frame 28.

As illustrated in FIGS. 4 and 5, the central transmission part 62 is carried by the carriage 90. Preferably, the central transmission part 62 surrounds the carriage 90.

The two intermediate links 68 are arranged on either side of the carriage 90.

The axis of rotation A5 of the central transmission part 62 is perpendicular to the direction of adjustment of the carriage 90.

Thus, the central transmission part 62 is able to be rotated according to the axis of rotation A5 relative to the carriage 90, by displacement of the pedals 32 relative to the frame 28.

In other words, throughout the foregoing, when reference is made to rotation of the central transmission part 62 relative to the frame 28 according to the axis of rotation A5, this is synonymous with rotation of the central part 62 relative to the carriage 90 according to the axis A5, when the carriage 90 is locked in position relative to the slide 88.

The slide 88 comprises at least one guide rod 94 extending according to the adjustment direction. In the example shown in FIG. 8, the slide 88 comprises two guide rods 94 extending according to the adjustment direction. Alternatively, the slide 88 comprises a single guide rod 94 or more than two guide rods 94.

In particular, the carriage 90 presents, for each guide rod 94, a guide hole receiving the guide rod 94.

A displacement of the carriage 90 relative to the slide 88 simultaneously causes a displacement of the central transmission part 62 relative to the frame 28 in the adjustment direction and thus a displacement of the operating position of the pedals 32 relative to the frame 28.

Indeed, when the carriage 90 is displaced relative to the slide 88 in the adjustment direction, the displacement of the central transmission part 62 displaces each intermediate link 68 relative to the frame 28, and the displacement of each intermediate link 68 drives in rotation the associated crank 48 about the axis of rotation A1 relative to the frame 28 and thus the pedals 32. The two pedals 32 are thus jointly displaced by the same distance. They are moved closer to or further away from the seat of the pilot by this same distance.

The ergonomic adjustment of the pedals 32 of the rudder pedal 22 does not cause any rotation of the central transmission part 62 relative to the frame 28 about the axis of rotation A5.

Thus, despite the connection of the output shafts 36 of the two rudder pedals 22 by the main connecting rod 24, the ergonomic adjustments of the rudder pedals 22 are independent of each other.

This is clearly shown in FIG. 2, which shows separate ergonomic settings for the two rudder pedals 22.

During the ergonomic adjustment, the angular orientation of the pedals 32 relative to the respective cranks 48 evolves through the kinematic trapezoid formed by the crank 48 and the lever 52. However, this evolution occurs over an angular range consistent with the permissible angles of the ankles of the pilots.

The device for displacing and locking 92 the carriage 90 to the slide 88 preferably comprises an adjustment screw 96.

The adjustment screw 96 is, for example, a worm screw.

For example, the adjustment screw 96 is able to cooperate with the carriage 90 to drive in translation the carriage 90 relative to the slide 88 along the adjustment direction when the adjustment screw 96 is rotated relative to the slide 88.

For this purpose, the carriage 90 presents a drive opening receiving the adjusting screw 96.

In particular, the adjusting screw 96 is also configured to lock the carriage 90 in position. In this case, the adjusting screw 96 is irreversible.

In particular, the irreversibility of the adjustment screw 96 is then sufficient to prevent the carriage 90 from moving relative to the slide 88, when the pilot presses on the pedals 32.

Thus, in this example, the irreversible adjustment screw 96 ensures both the function of displacement of the carriage 90 and of locking the position of the carriage 90. Alternatively, or additionally, the displacement and locking device 92 comprises another dedicated locking system, in particular separate from the adjustment screw 96.

The adjustment screw 96 extends according to the adjustment direction.

Here, the adjustment direction is parallel to the slide 88.

Advantageously, the displacement and locking device 92 also comprises an adjustment gear motor 98 and/or a manual adjustment member 100.

The adjustment gear motor 98 is able to be actuated by a pilot to drive in rotation the adjustment screw 96 relative to the slide 88.

The manual adjustment member 100 is able to transmit, to the adjustment screw 96, a manual torque exerted by a pilot to drive in rotation the adjustment screw 96 relative to the slide 88.

Thus, even in the event of failure of the adjustment gear motor 98, the pilot is always able to adjust the ergonomics of the rudder pedal 22 by actuating the manual adjustment member 100.

In the preferred embodiment comprising this ergonomic adjustment system 44, the mechanical kinematic chain 38 of the rudder pedal 22 is able to transmit to the output shaft 36 the displacement of the pedals 32 relative to the frame 28 for any position of the carriage 90 on the slide 88.

In the mechanical kinematic chain 38, the transmission mechanism 66 joining the central transmission part 62 to the output shaft 36 then preferably comprises a sliding connection 102 interposed between the two universal joints 74.

In the example shown in FIG. 6, the sliding connection 102 is joined to the central transmission part 62 by one of the universal joints 74 and is joined to the output shaft 36 by the other of the universal joints 74.

The sliding connection 102 presents a sliding axis.

The sliding axis passes, for example, through both universal joints 74.

The sliding connection 102 is able to be rotated as a unit, about the sliding axis, relative to the central transmission part 62 and relative to the output shaft 36.

Thus, as the carriage 90 is displaced along the direction of adjustment, the sliding connection 102 allows for a decrease or increase in the distance between the central transmission part 62 and the output shaft 36, while allowing the transmission of the rotation of the central part 62, relative to the frame 28, to the output shaft 36.

In a preferred embodiment, shown in FIG. 6, the sliding connection 102 comprises a sleeve 104 and a drive rod 106. In other words, the drive rod 106 is able to slide along the sleeve 104 according to the sliding axis.

In the illustrated example, the central transmission part 62 is joined to the sleeve 104 by one of the two universal joints 74 and the output shaft 36 is joined to the drive rod 106 by the other of the two universal joints 74.

The drive rod 106 is partially received in the sleeve 104.

In order for the sliding connection 102 to be rotated as a single unit, about the sliding axis, the sleeve 104 presents an inner surface advantageously cooperating with an outer surface of the drive rod 106 to block any rotation about the sliding axis of the drive rod 106 relative to the sleeve 104.

In the illustrated example, the sleeve 104 presents a closed cross section.

Preferably, the inner surface of the sleeve 104 and the outer surface of the drive rod 106 present non-circular cross-sections, in at least one region where said surfaces are in contact.

In one advantageous embodiment, illustrated in FIG. 6, the drive rod 106 and the sleeve 104 are splined.

In particular, the drive rod 106 and the sleeve 104 present corresponding splines.

The splines extend parallel to the sliding axis.

The shape of the splined drive rod 106 and the sleeve 104 allow for locking of the rotation of the drive rod 106 relative to the sleeve 104 about the sliding axis and transmission of high torques from the center piece to the output shaft 36.

The advantageous function of braking by the rudder pedal 22 will now be described.

In this preferred embodiment, at least one of the pedal side systems 30 of the rudder pedal 22 also includes a braking system 108.

Advantageously, each pedal side system 30 comprises a braking system 108 such as described below.

Each pedal side system 30 then carries its own braking system 108, which allows redundancy of the braking control within the rudder pedal 22 and avoids depending on a central station common to both pedal side systems 30, safety is improved. It is understood that it is also possible to avoid depending on a central acquisition station common to the two rudder pedals 22 for braking.

Each braking system 108 is able to control the braking of the aircraft 10, when the wheels of the aircraft 10 are in contact with the ground.

Each braking system 108 comprises the pedal 32 of the associated pedal side system 30, the pedal 32 then being connected to the crank 48 by a braking pivotal link 110.

In a preferred embodiment, the braking system 108 also comprises a brake stop, the brake stop defining a stop position of the pedal 32.

Each braking system 108 also comprises a braking acquisition system 112.

Preferably, each braking system 108 further comprises a braking force restitution system 114.

In the illustrated embodiment, the pedal 32 is able to be rotated relative to the crank 48 about an axis of rotation A9 passing through said braking pivotal link 110.

Such a rotation of the pedal 32 relative to the crank 48 about the axis of rotation A9 corresponds, for example, to a rotation of the foot of the pilot about his heel and is intended to control a braking of the aircraft 10. The pilot then presses a zone of the pedal 32 offset relative to the axis A9.

The pedal 32 is able to be rotated relative to the crank 48 about the axis of rotation A9 independently of any joint rotation of the pedal 32 and the crank 48 relative to the frame 28 according to the axis of rotation A1.

In other words, the pilot can control the yaw angle and the braking independently by two distinct movements of his foot. There is no coupling of the yaw control and the braking control.

Moreover, the two pedals 32 of the rudder pedal 22 are able to be rotated relative to their respective cranks 48 about their respective axes of rotation A9 independently of each other.

In other words, there is no coupling of the braking by the pedals 32.

The axis of rotation A9 of the pedal 32 relative to the crank 48 is advantageously parallel to the axis of rotation A1 of the crank 48 relative to the frame 28. Alternatively, the axis of rotation A9 presents a non-zero angle, for example of a few degrees, with the axis of rotation A1, with the pedal 32 being more oriented towards the pilot than the axis of rotation A1.

Preferably, the braking pivotal link 110 of the pedal 32 is concurrent with said second pivotal articulation connection 56 of the crank 48 with the support link 54.

In other words, the axis of rotation A2 of the crank 48 relative to the support link 54 is substantially coincident with the axis of rotation A9 of the pedal 32 relative to the crank 48.

The braking acquisition system 112 is configured to generate an electrical signal representative of a displacement of the pedal 32 relative to the crank 48 about the axis of rotation A9.

The braking acquisition system 112 is supported by at least one of the crank 48, the lever 52, and the support link 54. Preferably, in the example shown in FIG. 7, the braking acquisition system 112 is supported by the support link 54.

To accomplish this, the braking acquisition system 112 comprises at least one acquisition sensor 116. Preferably, the braking acquisition system 112 comprises at least two redundant acquisition sensors 116. Even more preferably, the braking acquisition system 112 comprises at least three redundant acquisition sensors 116. In the preferred embodiment of FIGS. 7 and 8, the braking acquisition system 112 comprises at least four redundant acquisition sensors 116.

The braking acquisition system 112 also comprises a joint drive device 118 of the acquisition sensors 116.

Preferably, the braking acquisition system 112 comprises a system 120 for disabling the acquisition sensors 116.

Figure 7:
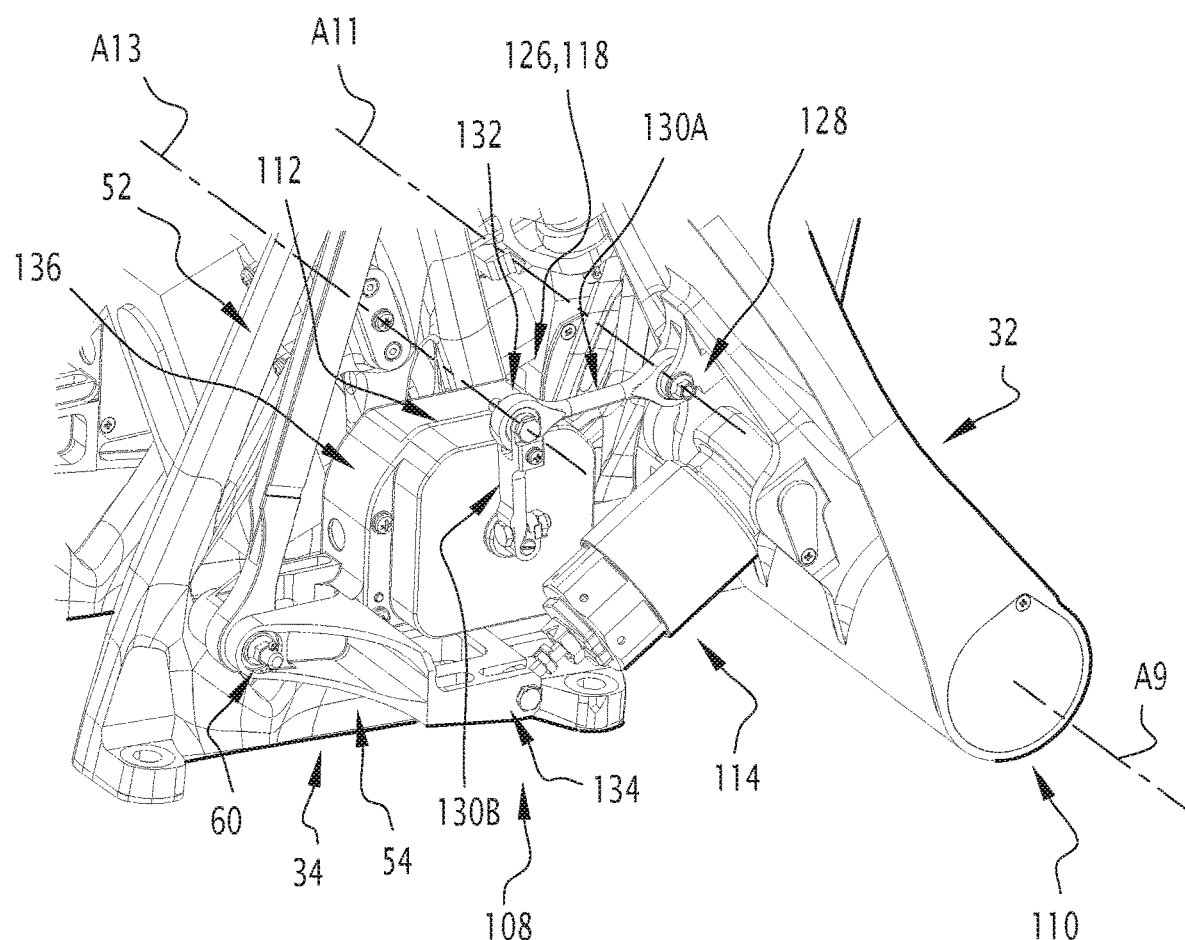
FIG. 7 is a perspective schematic view of a braking system of the rudder pedal.

In the example shown in FIG. 7, the braking acquisition system 112 also comprises a cover, covering the acquisition sensors 116.

Each acquisition sensor 116 comprises a fixed element and a movable element, the movable element being able to be displaced relative to the fixed element.

Each fixed element is preferably integral with one of the crank 48, the lever 52, and the support link 54, for example the support link 54.

In particular, each acquisition sensor 116 comprises a roller 122 integral with the movable element.

Each acquisition sensor 116 is able to generate an electrical measurement signal as a function of the position of the movable element relative to the fixed element over a useful electrical measurement travel.

Each redundant acquisition sensor 116 preferably presents the same useful electrical measurement travel.

For each redundant acquisition sensor 116, an electrical measurement signal is generated in parallel. Here also, by "parallel generated measurement signals" or "parallel measurement signals" is meant signals generated by each of the redundant acquisition sensors 116 for the same relative displacement of the movable elements by the joint drive device 118.

The acquisition sensors 116 are preferably rotatable.

Advantageously, each acquisition sensor 116 is a resistive sensor, for example a potentiometer, the fixed element comprising a resistive track and the movable element then comprising a slider. Alternatively, each acquisition sensor is an inductive sensor, for example an RVDT (Rotary Variable Differential Transformer) sensor, the fixed element then comprising at least one winding, preferably at least one primary winding and one secondary winding, the movable element then comprising a core.

The joint drive device 118 is able to simultaneously displace the movable elements relative to the respective fixed elements by the same relative displacement.

The joint drive device 118 is able to transform the rotation of the pedal 32 relative to the crank 48 about the axis of rotation A9 into a joint displacement of the movable elements relative to the respective fixed elements.

To accomplish this, the joint drive device 118 preferably comprises a joint drive frame 124 for the rollers 122 of the acquisition sensors 116.

In the example shown in FIG. 7, the joint drive device 118 further comprises an actuator arm 126 of the drive frame 124.

The drive frame 124 is movable relative to the fixed elements of the acquisition sensors 116 and delimits, for each roller 122, a reception housing receiving the roller 122.

In particular, the drive frame 124 comprises a fork for each roller 122, the fork delimiting said reception housing for the roller 122.

The reception housing is here an open groove.

In the illustrated example, the drive frame 124 forms a cross. Any other shape could be considered, however.

In the preferred example where the acquisition sensors 116 are rotatable, the drive frame 124 is able to be rotated relative to the fixed elements of the acquisition sensors 116, about a predetermined axis of rotation.

The predetermined axis of rotation preferably passes through a geometric center of the drive frame 124, the geometric center then being located at the same distance from each roller 122. Alternatively, at least two of the rollers 122 are respectively arranged at different distances from said predetermined axis of rotation of the drive frame 124.

Figure 8:
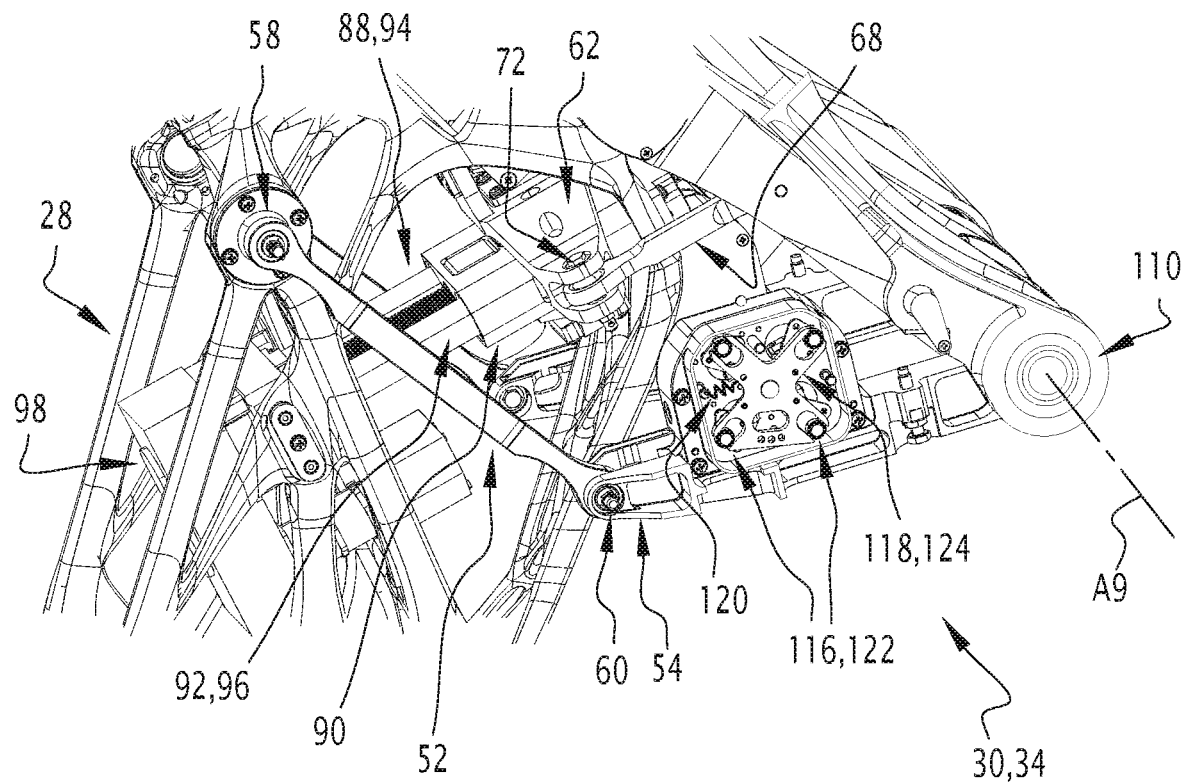
FIG. 8 is a schematic perspective section of the braking system of FIG. 7.

In the example shown in FIG. 8, the predetermined axis of rotation of the drive frame 124 relative to the fixed elements of the acquisition sensors 116 is parallel to the axis of rotation A9 of the pedal 32 relative to the crank 48.

For each acquisition sensor 116, rotation of the drive frame 124, relative to the fixed element, displaces the movable element relative to the fixed element of the acquisition sensor 116.

More specifically, rotation of the drive frame 124 simultaneously displaces the movable elements relative to the respective fixed elements by the same relative displacement.

The actuator arm 126 is able to transform the rotation of the pedal 32 relative to the crank 48 about the axis of rotation A9 into rotation of the drive frame 124 relative to the fixed elements of the acquisition sensors 116 about the predetermined axis of rotation of the drive frame 124.

To accomplish this, the actuator arm 126 is connected on the one hand to the pedal 32 and is on the other hand integral with the drive frame 124.

Preferably, the actuator arm 126 presents a point of articulation 128 with the pedal 32.

In other words, the actuator arm 126 is able to be rotated relative to the pedal 32 about an axis of rotation A11 passing through said point of articulation 128 of the actuator 126 with the pedal 32.

The axis of rotation A11 passing through said point of articulation 128 of the actuator arm 126 with the pedal 32 is preferably parallel to the axis of rotation A9 passing through said braking pivotal link 110.

As illustrated in FIG. 7, the actuator arm 126 is preferably angled.

In one preferred embodiment, the actuator arm 126 is further articulated.

The actuator arm 126 then comprises a first drive section 130A connected to the pedal 32 and a second drive section 130B integral with the drive frame 124.

The first drive section 130A is connected to the pedal 32 by means of said point of articulation 128 of the actuator arm 126 with the pedal 32.

Preferably, the first drive section 130A presents a pivotal articulation connection 132 with the second drive section 130B.

In other words, the first drive section 130A is able to be rotated relative to the second drive section 130B about an axis of rotation A13 passing through said pivotal articulation connection 132 of the drive sections 130A, 130B.

The distance between the axis of rotation A13 of the first drive section 130A relative to the second drive section 130B and the axis of rotation A11 of the actuator arm 126 relative to the pedal 32 remains constant during any displacement of the pedal 32 relative to the frame 28. For example, the first drive section 130A is thus rigid and non-deformable.

The second drive section 130B is mechanically linked to the drive frame 124 and is able to rotate in conjunction with the drive frame 124.

For example, the second drive section 130B is rigid and non-deformable.

In one preferred embodiment, the disabling system 120 of the acquisition sensors 116 is configured, for each acquisition sensor 116, to displace the movable element relative to the fixed element, in order to disable the useful electrical measurement travel of the acquisition sensor 116, in the event of uncoupling of the joint drive device 118.

In the illustrated example, the disabling system 120 exerts a disabling force on the drive frame 124.

The disabling force is sufficient to displace, for each acquisition sensor 116, the movable element relative to the fixed element out of the useful electrical measurement travel of the acquisition sensor 116, in the event of uncoupling of the joint drive device 118.

For this purpose, the disabling system 120 comprises, for example, at least one spring or spring assembly able to exert the disabling force.

In this example, the actuator arm 126 exerts, in the absence of the uncoupling of the joint drive device 118, a holding force on the drive frame 124 opposing the disabling force. The holding force is greater than or equal to the disabling force.

In other words, in the absence of uncoupling of the joint drive device 118, the actuator arm 126 holds each movable element within the useful electrical measurement travel of the acquisition sensor 116. When the joint drive device 118 is uncoupled, the holding force no longer applies and the disabling force displaces each movable element accordingly.

By "uncoupling of the drive device" is meant any event from which the drive device is no longer able to jointly displace the movable elements relative to the respective fixed elements. In particular, the drive device is then no longer able to transform the rotation of the pedal 32 about the axis of rotation A9 into a joint displacement of the movable elements relative to the respective fixed elements.

The uncoupling of the drive device refers, for example, to any failure, blockage, or breakage of a part of the joint drive device 118 or of a connection between two parts of the drive device. In particular, the term "breakage" refers to the fracturing of a solid thing into two or more parts under excessive stress or strain.

Examples include a break in the actuator arm 126, a break in the connection of the actuator arm 126 to the pedal 32 or the drive frame 124, or a break in a portion of the drive frame 124.

The uncoupling of the drive device, additionally or alternatively, refers to any fault in the assembly/disassembly of one or more parts of the drive device, such as, for example, the omission of a fastening screw, the loosening of one of the screws by vibration, or the misalignment of parts of the drive device.

The processing unit 26 of the control device 20 is in this example embodiment able to implement the braking function.

The processing unit 26 is connected to the braking acquisition system 112 and to at least one of the brakes of the aircraft 10.

The processing unit 26 is configured to receive each measurement signal from the brake acquisition system 112.

Specifically, in the example of the embodiment, the processing unit 26 is configured to receive the measurement signals generated in parallel by the acquisition sensors 116 of the braking acquisition system 112.

The processing unit 26 is configured to develop a brake control signal at least from each measurement signal received from the braking acquisition system 112, and in particular from the parallel measurement signals received from the braking acquisition system 112.

The processing unit 26 is then configured to send the developed braking control signal to at least one of the brakes of the aircraft 10.

In the preferred example of the present disclosure where the braking acquisition system 112 comprises the disabling system 120, of the acquisition sensor 116, the processing unit 26 is also configured to verify that each of the parallel measurement signals belongs to the useful electrical measurement travel of the acquisition sensor 116.

To accomplish this, the memory of the processing unit 26 stores, for example, characteristic information of the acquisition sensors 116, wherein the characteristic information comprises at least the useful electrical measurement travel of each acquisition sensor 116. During verification, the processing unit 26 compares each of the parallel measurement signals to the stored useful electrical measurement travel.

The processing unit 26 is configured to deduce whether the parallel measurement signals belong to the useful electrical measurement travel of the acquisition sensors 116.

Alternatively or additionally, the processing unit 26 is configured to compare measurement signals from at least two separate brake acquisition systems 112, and to deduce whether measurement signals from one of the acquisition systems 112 do not belong to the useful electrical measurement travel of the acquisition sensors 116.

The processing unit 26 is subsequently configured to generate the brake control signal from the parallel measurement signals verified as belonging to the useful electrical measurement travel of the acquisition sensors 116.

In other words, the braking control signal is therefore not generated from signals that do not belong to the useful electrical measurement travel of the acquisition sensors 116.

As a result, it is possible to rule out any measurement from a brake acquisition system 112 for which an uncoupling of the associated joint drive device 118 has occurred. This greatly improves the safety of the control device 20.

Furthermore, it is understood that the processing unit 26 is able to detect such an uncoupling of the joint drive device 118 from the described verification step.

Upon completion of the verification step, the processing unit 26 is preferably configured to inform the pilot of the detected uncoupling. For this purpose, the processing unit 26 is, for example, able to display a representative image associated with the detected uncoupling on the screen of the aircraft display system 10.

The braking force restitution system 114 is able to exert a force against a rotation of said pedal 32 relative to the crank 48 about the braking pivotal link 110.

The braking force restitution system 114 defines a stable position of the pedal 32 relative to the crank 48 according to the axis of rotation A9, the stable position being that adopted by the pedal 32 in the absence of external solicitation by the pilot.

The braking force restitution system 114 is supported by at least one of the crank 48, the lever 52 and the support link 54.

Advantageously, the braking force restitution system 114 and the braking acquisition system 112 are supported by the same element selected from among the crank 48, the lever 52, and the support link 54. In particular, the entire braking system 108 is carried on this same element.

Preferably, in the example shown in FIG. 7, the braking force restitution system 114 is supported by the support link 54.

In one example of the embodiment, the opposing force exerted by the yaw force restitution system 42 is preferably single slope.

In the illustrated example of the embodiment, the braking force restitution system 114 comprises, for example, at least one force member.

The force member comprises, for example, a spring. Preferably, the spring is a progressive spring.

The force member is able to exert said opposing force on the pedal 32.

Preferably, at least the force member is interposed between the pedal 32 and the support link 54 during rotation of the pedal 32 relative to the crank 48 about the braking pivotal link 110.

The pedal 32 is movable relative to the crank 48 about the braking pivotal link 110 between the stable position and the stop position against the brake stop.

The braking force restitution system 114 is separate from the braking acquisition system 112. This allows for improved safety.

In particular, the braking force restitution system 114 is arranged away from the braking acquisition system 112.

In the preferred example shown in FIG. 7, the element from among the crank 48, lever 52, and support link 54 that supports the braking system 108 (the support link 54 in this example) comprises a baseplate 134 and a wall 136 extending from the baseplate 134.

The drive frame 124 of the braking acquisition system 112 is then applied against said wall 136. The fixed elements of the acquisition sensors 116 are attached to the wall 136.

In addition, the braking force restitution system 114 presents an end that is integral with said baseplate 134.

The end of the braking force restitution system 114 is thus arranged away from the braking acquisition system 112.

In the above example, an aircraft control device 20 comprising at least two rudder pedals 22 has been described. Alternatively, the aircraft control device 20 comprises a single rudder pedal 22 as described above and is therefore devoid of a main connecting rod 24. In particular, the cockpit 16 then comprises only a single pilot seat. Indeed, many advantages related to the present disclosure remain interesting even in the case of a single rudder pedal 22.

Alternatively, to what has been described above, the central transmission part 62 is joined to the drive rod 106 by one of the universal joints 74 and the output shaft 36 is joined to the sleeve 104 by the other of the two universal joints 74.

As an alternative to the splined shapes of the sliding connection 102, any shape other than splined could be suitable for blocking any rotation about the sliding axis of the drive rod 106 relative to the sleeve 104. In another variant, one of the shaft and the sleeve 104 presents a groove that is non-perpendicular to the sliding axis and the other of the shaft and the sleeve 104 presents a key received in said groove.

Alternatively, the articulated support structure 34 of the pedal 32 comprises only the crank 48, and is therefore devoid of the lever 52 and the support link 54 described above.

In yet another alternative, in the or each rudder pedal 22, only one of the pedal side systems 30 of the rudder pedal 22 comprises a braking system 108 as described above.

By virtue of the mechanical kinematic chain 38 of the present disclosure, and in particular the homokinetic association of the two universal joints, the present disclosure allows the yaw angle control torque to be isolated at the end of the chain at the output shaft 36.

This subsequently allows the two rudder pedals 22 to be connected via the main connecting rod 24, while providing a large ergonomic adjustment range independently for each of the rudder pedals 22.

Through the combination of the crank 48, the lever 52 and the support link 54, forming in particular the kinematic trapezoid, the angular orientation of each pedal 32 relative to the crank 48 about the axis A9 is controlled, despite a large ergonomically adjustable possible travel of the operating position of the pedals 32.

Each rudder pedal 22 can be ergonomically adapted to a wide range of pilot sizes, comprising, notably, the height from 1.57 m to 1.91 m.

The frame 28 of the rudder pedal 22 may present any possible shape.

One preferred embodiment of the frame 28 will nevertheless be described hereafter.

For the frame 28 alone, independently of the direction of the aircraft 10, the following are defined:
  an elevation direction Z2, corresponding, for example, to the vertical direction Z1 when the frame 28 is fixed in the aircraft 10; and
  a longitudinal direction X2 orthogonal to the elevation direction Z2 and which is, for example, parallel to the longitudinal axis L of the aircraft 10, when the frame 28 is fixed to the cockpit floor 16;

a lateral direction Y2 that is orthogonal to said elevation direction Z2 and longitudinal direction X2.

The frame 28 comprises a base 150, a support framework 152, and connection interfaces 154A, 154B, 154C, each connection interface 154A-154C being able to connect another part of the rudder pedal 22 described above to the frame 28.

The frame 28 also comprises, for example, for each other part of the rudder pedal 22 described above, a system for securing 156 the part to the connection interface 154A-154C.

The frame 28 presents a longitudinal median plane, the longitudinal median plane being parallel to the elevation direction Z2 of the frame 28 and the longitudinal direction X2.

In particular, the median plane of the frame 28 passes through the lateral middle of the frame 28, in other words, the middle of the frame 28 along the lateral direction Y2.

Preferably, the base 150, the connecting interfaces 154A-154C, and the support framework 152 are integrally formed as one piece, in other words, as one piece.

In a preferred embodiment, the base 150 assembly, the connection interfaces 154A-154C, and the support framework 152 are integrally formed from a predetermined material and are preferably formed by a layering of said predetermined material, the predetermined material preferably being aluminum or an aluminum alloy.

The base 150 assembly, the connection interfaces 154A-154C, and the support framework 152 are then preferably manufactured by additive manufacturing.

The base 150 is able to secure the frame 28 in the aircraft 10.

In particular, the base 150 is able to be fixed to an inner surface of the aircraft 10.

The inner surface of the aircraft 10 corresponds in this example to a floor of the aircraft 10, in particular the floor of the cockpit 16 of the aircraft 10. Alternatively, the inner surface of the aircraft 10 is separate from the floor, in which case the rudder pedal 22 is suspended, for example.

For this purpose, the base 150 delimits an outer mounting surface 158 of the frame 28 and reception holes 160 for fixing elements of the base 150.

When the frame 28 is fixed to the inner surface of the aircraft 10 (here the floor), the outer attachment surface 158 of the base 150 is in contact with said inner surface of the aircraft 10 and fixing elements of the base 150 are received in the reception holes 160 and are fixed to the inner surface.

Furthermore, when the frame 28 is fixed to the inner surface of the aircraft 10, the base 150 is notably interposed between the support framework 152 and said inner surface of the aircraft 10.

The outer mounting surface 158 is, for example, flat.

The outer mounting surface 158 is in this example parallel to the longitudinal direction X2.

The elevation direction Z2 of the frame 28 is in this example perpendicular to the outer mounting surface 158.

The reception holes 160 for the fixing elements of the base 150 are through and open onto the outer mounting surface 158.

In one preferred embodiment, the base 150 comprises at least two half bases 162. Alternatively, the base 150 is plain.

The two half bases 162 are then separate and distant from each other.

The two half bases 162 are also arranged on either side of the longitudinal median plane of the frame 28.

The two half bases 162 are preferably symmetrical the one from the other relative to the longitudinal median plane of the frame 28.

The two half bases 162 extend parallel the one from the other.

In particular, each half base 162 extends along the longitudinal direction X2.

The support framework 152 connects each connection interface 154A-154C to the base 150.

The support framework 152 thus supports each connection interface 154A-154C.

In particular, the support framework 152 of the frame 28 is able to support at least each pedal side system 30, the mechanical kinematic chain 38, the ergonomic adjustment system 44, the yaw force restitution system 42, and the yaw acquisition system 40, when these elements are present in the rudder pedal 22 and connected by means of the respective connection interfaces 154A-154C.

The support framework 152 is able to receive the respective load of each of these parts of the rudder pedal 22 and transfer that load to the base 150. In other words, the support framework 152 is able to support the respective weight of each of these parts of the rudder pedal 22.

The support framework 152 is also able to resist the various actions of the pilot on the rudder pedal 22 and in particular on the pedals 32.

Figure 9:
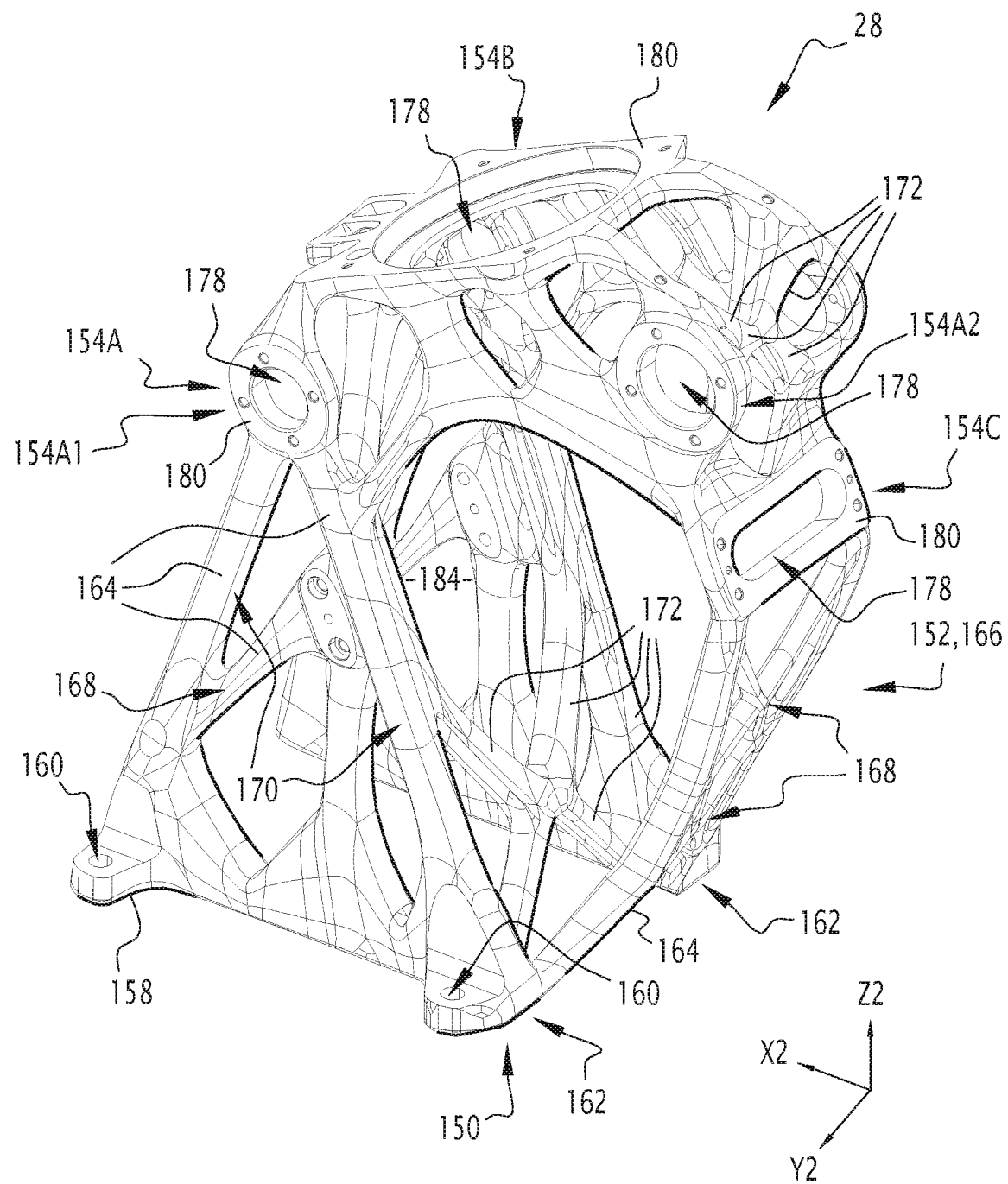
FIGS. 9 and 10 are schematic perspective views of the rudder pedal frame alone.
Figure 10:
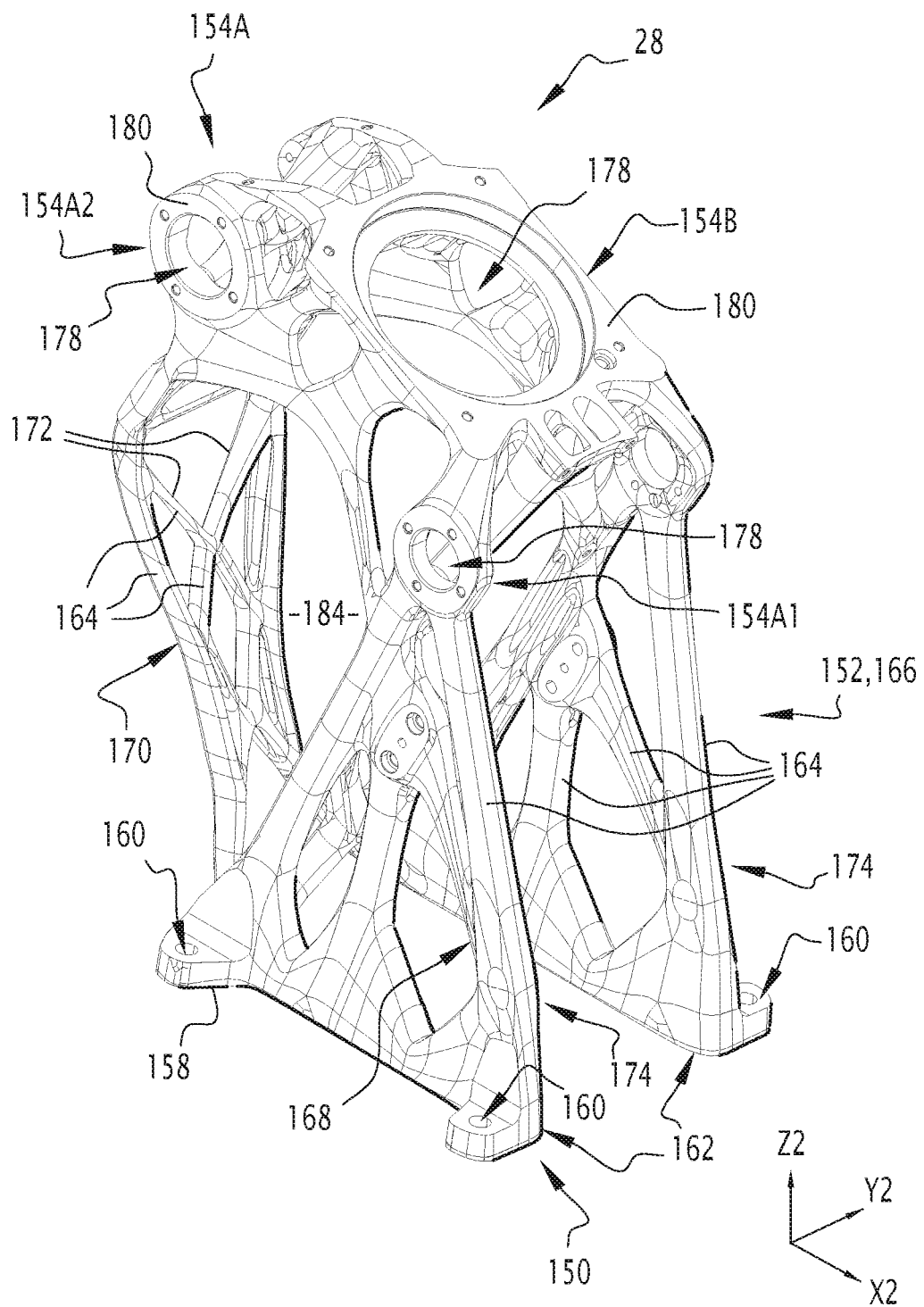

In the embodiment shown in FIGS. 9 and 10, the support framework 152 comprises the framework elements 164 arranged in a lattice 166, with at least one of the framework elements 164 extending from each connection interface 154A-154C.

The lattice shape 166 of the support framework 152 provides strength optimization for maximum permissible mass and maximum permissible footprint.

The lattice 166 extends from the base 150 according to the elevation direction Z2.

In particular, at least two of the framework elements 164 thus extend from the base 150, and, in the case where the base 150 comprises the two half bases 162, at least two of the framework elements 164 extend from each half base 162.

The lattice 166 also comprises the nodes 168 at which respectively at least two of the framework elements 164 intersect.

The lattice 166 is slender in the elevation direction Z2 to accommodate the mechanical kinematic chain along the rudder pedal 22.

Each framework element 164 extends along a guide.

Each framework element 164 extends along the guide between two ends.

The guide of each framework element 164 is, for example, straight or curved.

In one embodiment of the present disclosure, each framework element 164 extends along the guide from one of the nodes 168, one of the connection interfaces 154A-154C or the base 150, to another of the nodes 168, another of the connection interfaces 154A-154C or the base 150.

As illustrated, at least 50% of the framework elements 164 are elongated. Preferably, at least 75% of the framework elements 164 are elongated. Advantageously, all of the framework elements 164 are elongated.

By "elongated framework element" is meant that the framework element is longer than it is wide.

In one advantageous embodiment, at least 50%, preferably at least 75%, of the framework elements 164 respectively have a length at least twice, for example at least five times, greater than the largest transversal dimension.

The "length" here is taken according to the respective guide of the framework element 164, and the term "transversal" is understood to be perpendicular to the guide.

By "greatest transversal dimension" is meant the greatest straight line distance joining two points on the outer contour of the cross section of the framework element 164.

As illustrated in FIGS. 9 and 10, the respective guides of at least three of the framework elements 164 extend out of the same plane. In other words, the lattice 166 is three-dimensional. Thus, the lattice 166 extends in all three directions, elevational Z2, longitudinal X2 and lateral Y2.

Preferably, each framework element 164 presents a variable or constant transversal section along the guide of the framework element 164.

Advantageously, each framework element 164 that extends from the base 150 presents a variable transversal section along the guide flaring toward the base 150.

For example, each framework element 164 presents a hollow tubular transversal section or a C-shaped transversal section.

The framework elements 164 of the support frame 152 comprise the support framework elements 170 and the bracing framework elements 172.

Each support framework element 170 is able to transmit to the base 150 the load from one of the connection interfaces 154A-154C.

Each support framework element 170 has a guide presenting at least one component according to the elevation direction Z2.

For each connection interface 154A-154C, at least one of the support framework elements 170 extends from the connection interface 154A-154C. The connection interface 154A-154C thus forms one end of each of its support framework elements 170.

Each support framework element 170 is able to support the weight of the part connected to the frame 28 by means of the connection interface 154A-154C.

Each support framework element 170 of the connection interface 154A-154C is then in particular arranged between the base 150 and said connection interface 154A-154C, projecting in the elevation direction Z2 of the frame 28.

The bracing framework elements 172 are able to stabilize the support framework 152 vis-a-vis the lateral and/or longitudinal effects resulting from actions on the frame 28, in particular from the pilot during the actuation of the rudder pedal 22.

The bracing framework elements 172 are able to locally stabilize at least a portion of the support framework elements 170, for example relative to the buckling instability phenomena.

Each bracing framework element 172 has a guide presenting at least one component according to the longitudinal direction X2 or the lateral direction Y2.

Each bracing framework element 172 thus preferably cooperates with at least one of the supporting framework elements 170 at a node arranged between the two ends of the supporting framework element 170.

For example, the bracing framework elements 172 extend substantially laterally or substantially longitudinally.

In the lattice 166, some of the bracing framework elements 172 advantageously form crosses.

In the lattice 166, at least some of the framework elements 164 are both support and bracing framework element(s). In particular, these elements have a guide presenting at least one component according to the elevation direction Z2 and at least one component according to the longitudinal direction X2 or the lateral direction Y2.

In the lattice 166, at least 50% of the nodes 168 are distributed according to a spatially symmetrical arrangement. The spatial symmetrical arrangement presents a plane of symmetry, preferably corresponding to the longitudinal median plane of the frame 28.

Preferably, at least 75% of the nodes 168 are distributed according to the spatial symmetrical arrangement. Advantageously, all of the nodes 168 are distributed according to the spatially symmetrical arrangement.

In the lattice 166, at least 50% of the framework elements 164 are distributed according to a spatially symmetric arrangement. The spatial symmetrical arrangement presents a plane of symmetry, preferably corresponding to the longitudinal median plane of the frame 28.

Preferably, at least 75% of the framing elements 164 are distributed according to the spatial symmetric arrangement. Advantageously, all of the framework elements 164 are distributed according to the spatial symmetrical arrangement.

In the preferred embodiment shown in FIGS. 9 and 10, the lattice 166 comprises two side half lattices 174, respectively formed by a part of the framework elements 164.

The side half lattices 174 are arranged on either side of the longitudinal median plane of the frame 28.

The side half lattice 174 are laterally connected to each other by at least one of the bracing framework element 172.

In the example shown in FIGS. 9 and 10, the side half lattices 174 are laterally connected by bracing framework elements 172 forming a cross. The cross is preferably centered on the longitudinal median plane of the frame 28.

Each side half lattice 174 extends from one of the half bases 162.

At least one of the supporting framework elements 170 of each side half lattice 174 extends substantially parallel to the longitudinal median plane.

The securing systems 156 are not shown in FIGS. 9 and 10 but are visible in FIGS. 2 to 5.

For each part connected to the frame 28 by means of one of the connection interfaces 154A-154C, the associated securing system 156 comprises at least one fixing member, preferably fixing members.

The part of the rudder pedal 22 so connected belongs to one of the pedal side systems 30, the mechanical kinematic chain 38, the ergonomic adjustment system 44, the yaw force restitution system 42, or the yaw acquisition system 40.

The associated securing system 156 optionally also comprises an intermediate fixing member 176 separate from the part and separate from the connection interface 154A-154C, the intermediate connection member 176 being interposed between the part and the connection interface 154A-154C.

When the part is connected to the frame 28, the connection interface 154A-154C is in contact with the intermediate fixing member 176 and the intermediate fixing member 176 is in contact with the part.

Such intermediate fixing members 176 are used, for example, to connect the crank 48 and the lever 52 to the corresponding connection interfaces 154A-154C, respectively. Each intermediate fixing member 176 then defines one of the corresponding pivotal articulation connections, with the associated axis of rotation passing through the intermediate fixing member 176.

In the event that the securing system 156 is devoid of such an intermediate fixing member 176, the connection interface 154A-154C is in contact with the part, when this is connected to the frame 28.

As noted above, each connection interface 154A-154C is able to connect to another part of the rudder pedal 22.

In other words, the load from said other part is transmitted to the base 150 by means of the associated connection interface 154A-154C.

Generally speaking, each connection interface 154A-154C is either male or female.

The respective male or female nature of each connection interface 154A-154C is independent of the respective male or female nature of each other interface. In other words, all of the interfaces may be female (as illustrated in FIGS. 9 and 10), all of the interfaces may be male, or any non-zero number of the interfaces may be female and the remainder of the interfaces being male.

Thus, each connecting interface 154A-154C is able to be inserted into a distinct element (male character) or to receive the distinct element (female character) to connect the part of the rudder pedal 22 associated with the frame 28.

More specifically, said distinct element is for example the part itself, where the part is directly fixed to the connection interface 154A-154C and therefore in contact with the connection interface 154A-154C. Alternatively, said element is, for example, the intermediate fixing member 176 of the securing system 156, when the part is connected to the frame 28 by means of the intermediate fixing member 176 and the connection interface 154A-154C.

Each male connection interface 154A-154C comprises a projecting portion able to be inserted into said element to connect the part of the rudder pedal 22 associated with the frame 28.

The projecting portion is, for example, cylindrical.

Each female connection interface 154A-154C delimits a reception housing 178 able to receive said element for connecting the part of the rudder pedal 22 associated with the frame 28.

The reception housing 178 is in the form of a cross.

The reception housing 178 preferably corresponds to a bore. In particular, the reception housing 178 is continuous.

For example, the reception housing 178 is cylindrical.

In addition, each connection interface 154A-154C comprises at least one fixing region 180.

The fixing region 180 delimits at least one reception hole for each member of the associated securing system 156. As illustrated in the figures, the fixing region 180 preferably delimits at least two reception holes for a fixing member, advantageously at least three reception holes, more preferably at least four reception holes.

When the part of the rudder pedal 22 is connected to the frame 28 by means of the associated connection interface 154A-154C, the fixing region 180 is in contact with said part or with the intermediate fixing member 176 and the fixing members are received in the reception holes while also being fixed to the part or intermediate fixing member 176.

The fixing region 180 surrounds the reception housing 178 or the projecting portion of the connection interface 154A-154C.

The fixing region 180 is preferably planar.

The fixing region 180 presents an outer contour and an inner contour.

The reception housing 178 or projecting portion extends from the inner contour of the fixing region 180.

Thus, by the phrase "a framework element extends from the connection interface" is meant that the framework element 164 extends from the fixing region 180, and in particular from the outer contour of the fixing region 180.

Examples of connection interfaces 154A-154C for parts of the rudder pedal 22 will now be described.

In one preferred embodiment, the connection interfaces 154A-154C comprise at least two pedal interfaces 154A, each pedal interface 154A corresponding to a connection interface of one of the pedal articulated support structures 34 of the rudder pedal 22. The two pedal interfaces 154A are then disposed on either side of the longitudinal median plane of the frame 28.

These two pedal interfaces 154A are intended to connect respectively the cranks 48 of the two pedal articulated support structures 34 of the rudder pedal 22.

In the preferred embodiment illustrated in the figures, the connection interfaces 154A-154C comprise at least four pedal interfaces 154A divided into two pairs of pedal interfaces 154A.

The spatial distribution of the four pedal interfaces 154A is preferably symmetrical relative to said longitudinal median plane.

These four pedal interfaces 154A are intended to connect respectively the cranks 48 and the levers 52 of the two pedal articulated support structures 34 of the rudder pedal 22.

Each pair of pedal interfaces 154A is able to be connected to the same pedal articulated support structure 34 of the rudder pedal 22.

In other words, each pair of pedal interfaces 154A together support the weight of the same pedal articulated support structure 34 of the rudder pedal 22 and the pedal associated with that articulated structure.

For each pair, the pedal interfaces 154A of the pair are arranged on the same side of the longitudinal median plane of the frame 28.

For each pedal interface 154A, the reception housing 178 (in the case of a female pedal interface) or the projecting portion (in the case of a male pedal interface) is advantageously rotationally cylindrical.

The inner contour of the fixing region 180 of each pedal interface 154A is circular.

Additionally, the outer contour of the fixing region 180 of each pedal interface 154A is preferably circular.

One of the pedal interfaces 154A of the pair forms a distal pedal interface 154A1 and the other forms a proximal pedal interface 154A2.

When projected in the longitudinal direction X2, the distal pedal interface 154A1 is arranged further from the seat of the pilot than the proximal pedal interface 154A2.

In the pair of pedal interfaces 154A, the distal pedal interface 154A1 is able to be connected to the lever 52 of the associated pedal articulated support structure 34 and the proximal pedal interface 154A2 of the pair is able to be connected to the crank 48 of the associated pedal articulated support structure 34.

When the pedal articulated support structure 34 is connected to the frame 28, the axis of rotation A3 of the lever 52 relative to the frame 28 thus passes through the distal pedal interface 154A1.

When the pedal articulated support structure 34 is connected to the frame 28, the axis of rotation A1 of the crank 48 relative to the frame 28 thus passes through the proximal pedal interface 154A2.

The support framework 152 is able to resist the actions of the pilot on the pedals 32. In particular, the support framework 152 is able to resist a force of at least 100 daN, preferably at least 130 daN, exerted by means of the distal and proximal pedal interfaces.

In particular, the distal pedal interface 154A1 is connected to the base 150 by two support framework elements 170 able to transmit the load carried by the distal pedal interface 154A1 to the base 150, the two support framework elements 170 diverging from the distal pedal interface 154A1. Each of these two support framework elements 170 extends from the distal pedal interface 154A1 to the base 150.

In particular, the distal pedal interface 154A1 is so connected to one of the pedal half bases 162.

When projected in the longitudinal direction X2, the distal pedal interface 154A1 overlaps with the base 150. In the example of FIGS. 9 and 10, when projected in the longitudinal direction X2, the distal pedal interface 154A1 is arranged in the longitudinal middle of the base 150.

The proximal pedal interface 154A2 is longitudinally arranged beyond the base 150.

The proximal pedal interface 154A2 thus protrudes out of plumb from the base 150.

In other words, when projected in the longitudinal direction X2, the proximal pedal interface 154A2 does not overlap the base 150.

Furthermore, when projected in the longitudinal direction X2, the proximal pedal interface 154A2 is arranged away from the base 150.

The proximal pedal interface 154A2 is arranged above the distal pedal interface 154A1.

In other words, when projected in the elevation direction Z2 of the frame 28, the distal pedal interface 154A1 is arranged between the proximal pedal interface 154A2 and the base 150.

In the pair of interfaces, the diameter of the proximal reception housing 178 (in the case of a proximal female pedal interface) or the proximal protrusion (in the case of a proximal male pedal interface) is, for example, greater than the diameter of the distal reception housing 178 (in the case of a distal female pedal interface) or the distal protrusion (in the case of a distal male pedal interface).

Preferably, the width between the two proximal pedal interfaces 154A2 is less than the width between the two distal pedal interfaces 154A1. Here, for example, it is a question of the width between the fixing regions of the interfaces. The width here is taken according to the lateral direction Y2.

Furthermore, as illustrated in FIGS. 9 and 10, the two proximal pedal interfaces 154A2 are advantageously connected laterally by bracing framework elements 172 forming a cross. The cross is arranged between the two proximal pedal interfaces 154A2.

The cross is preferably centered on the longitudinal median plane of the frame 28.

In one preferred embodiment, the connection interfaces 154A-154C comprise at least one sensor interface 154B corresponding to a connection interface of the yaw acquisition system 40 of the rudder pedal 22.

In the example of FIGS. 9 and 10, the reception housing 178 (in the case of a female sensor interface) or the projecting portion (in the case of a male sensor interface) defines a shoulder.

Advantageously, the reception housing 178 (in the case of a female sensor interface) or the projecting portion (in the case of a male sensor interface) is rotationally cylindrical.

In particular, the inner contour of the fixing region 180 of the sensor interface 154B is circular.

As illustrated in FIGS. 9 and 10, for each pedal interface 154A, one of the framework elements 164 connects the pedal interface 154A to the sensor interface 154B by extending from the pedal interface 154A to the sensor interface 154B.

The sensor interface 154B is arranged above each distal pedal interface 154A1.

In other words, each distal pedal interface 154A1 is arranged between the sensor interface 154B and the base 150 in projection according to the elevation direction Z2 of the frame 28.

In one preferred embodiment, the connection interfaces 154A-154C comprise at least one adjustment interface 154C corresponding to a connection interface of the ergonomic adjustment system 44 of the rudder pedal 22.

The adjustment interface 154C is also able to allow the pilot access to the adjustment screw 96.

The reception housing 178 (in the case of a female adjustment interface) or the projecting portion (in the case of a male adjustment interface) is oblong cylindrical. The corresponding shape is thus longer than it is wide and terminated by two half cylinders.

In particular, the inner contour of the fixing region 180 of the adjustment interface 154C is oblong. The inner contour is thus longer than it is wide and presents rounded corners.

In addition, the outer contour of the fixing region 180 of the adjustment interface 154C is preferably rectangular and has rounded corners.

For example, the adjustment interface 154C is centered on the longitudinal median plane of the frame 28.

The adjustment interface 154C is, for example, longitudinally arranged beyond the base 150.

Thus, the adjustment interface 154C protrudes out of the plumb line of the base 150.

In other words, when projected in the longitudinal direction X2, the adjustment interface 154C does not overlap with the base 150.

Furthermore, when projected in the longitudinal direction X2, the adjustment interface 154C is arranged away from the base 150.

As illustrated in FIGS. 9 and 10, the adjustment interface 154C is connected to the base 150 by at least two support framework elements 170 able to transmit the load carried by the adjustment interface 154C to the base 150.

Each of these two support framework elements 170 of the adjustment interface 154C extends from the adjustment interface 154C to the base 150.

In the preferred example illustrated, at least one of the support framework elements 170 of the adjustment interface 154C connects the adjustment interface 154C to a first of the two half bases 162, and at least one other of the support framework elements 170 of the adjustment interface 154C connects the adjustment interface 154C to the second of the two half bases 162.

In the example of FIGS. 9 and 10, each support framework element 170 of the adjustment interface 154C extends from one of the rounded vertices of the outer contour of the fixing region 180 of the adjustment interface 154C, respectively.

Said two support framework elements 170 of the adjustment interface 154C are then advantageously laterally connected by the bracing framework elements 172 forming at least one cross, and in the illustrated example forming at least two crosses.

Each cross is preferably centered on the longitudinal median plane of the frame 28.

In one embodiment, the adjustment interface 154C is longitudinally arranged beyond the proximal pedal interface 154A2.

The adjustment interface 154C is arranged below each proximal pedal interface 154A2.

In other words, for each proximal pedal interface 154A2, the adjustment interface 154C is arranged between the proximal pedal interface 154A2 and the base 150 in projection according to the elevation direction Z2 of the frame 28.

In the preferred embodiment, the support framework 152 also delimits a central functional passage 184. Thus, the central functional passage 184 is delimited by the framework elements 164 of the lattice 166.

In particular, the central functional passage 184 is laterally bounded by the two side half lattices 174.

The central functional passage 184 extends longitudinally and in the elevation direction Z2.

The central functional passage 184 opens longitudinally to the adjustment interface 154C.

The central functional passage 184 is thus able to receive at least the slide 88 and the carriage 90 of the adjustment system.

The central functional passage 184 also opens, in the elevation direction Z2, to the sensor interface 154B.

The central functional passage 184 is able to receive at least a part of the mechanical kinematic chain of the rudder pedal 22. In particular, the central functional passage 184 is, for example, at least able to receive at least the central transmission part 62 and the transmission mechanism 66 joining the central transmission part 62 to the output shaft 36.

The central functional passage 184 allows for the passage of at least one cylinder with a diameter greater than or equal to 100 mm.

The central functional passage 184 constitutes a significant space in the center of the frame 28 to accept the translation of the carriage 90 and of a part of the mechanical kinematic chain, advantageously over the authorized adjustment travel of at least 100 mm.

The central functional passage 184 also constitutes a space able to accommodate the adjustment gear motor 98.

In one preferred embodiment, the connection interfaces 154A-154C also comprise at least one wiring interface, not shown, corresponding to a connection interface of a segregation box of the rudder pedal 22.

The segregation box of the rudder pedal 22 is able to centralize and redistribute the cables to the various connectors.

A manufacturing method for the frame 28 of the rudder pedal described above will now be described. Any manufacturing method can be considered by the skilled person.

In one preferred embodiment, the manufacturing method comprises a step of additively manufacturing the entire base 150, the connector interfaces 154A-154C, and the support framework 152.

Additionally, the method advantageously comprises a step of applying a coating to the frame 28. This step is, for example, a protection by anaphoresis.

In the preferred additive manufacturing embodiment, the entire base 150, connection interfaces 154A-154C, and support framework 152 are formed by a superposition of successive layers, with the layers being deposited on top of each other.

Each layer includes at least one solid area. Eventually, each layer includes void areas delimited by adjacent solid areas, depending on the shape of the base 150, the connecting interfaces 154A-154C, and the support framework 152.

Additive manufacturing is particularly well suited to the manufacture of the frame 28 given the particular shape of the support framework 152. This shape presents angles or notches that would be difficult to obtain by molding (constrained by the shape of the mold) or milling (no space for the machine head).

Additive manufacturing makes it possible to ensure stiffness and mass constraints by manufacturing in one piece, despite a slender shape, thin cross-sections and tight tolerances.

In one embodiment, the additive manufacturing step comprises at least the following steps:
a) forming a powder layer;
b) selectively melting at least one region of the powder layer; and
c) repeating steps a) and b) to form the entire base 150, connecting interfaces 154A-154C, and supporting framework 152.

The additive manufacturing step is, for example, implemented by a manufacturing apparatus including at least one support surface, a device for forming successive layers of powder on the support surface, a device for selectively melting the powder, and a system for moving the selective melting device relative to the support surface.

The manufacturing apparatus also includes a control unit for the forming device, the selective melting device, and the displacement system.

In step a), each powder layer formed is flat.

Each powder layer is free of macroscopic relief with a height greater than 4 times the average thickness of the layer.

The powder is, for example, a metallic powder. The metal powder is preferably an aluminum or aluminum alloy powder.

In particular, step a) is implemented by the forming device and the control unit controlling the forming device.

During step b), each solid area and each possible empty area of the layer is/are formed.

During step b), the metal powder is brought to its melting point.

In particular, step b) is implemented by the selective melting device, the displacement system and the control unit controlling the selective melting device and the displacement system.

In one advantageous embodiment, the additive manufacturing is by selective laser beam melting, LBM (from the English acronym "Laser Beam Melting").

The selective melting device therefore comprises a laser capable of melting and fusing the metal powder of the layer formed in the previous step a) with the previous layers.

During step b), the control unit calculates, for example from a digital model of the frame 28, the spatial arrangement of each area to be irradiated within the powder layer formed in the previous step a) to form the base 150, the connecting interfaces 154A-154C and the supporting framework 152.

Based on this, the displacement system is controlled by the control unit to position the laser of the selective melting device relative to the layer formed in the previous step a) to irradiate each area to be formed of the layer.

A method of assembling a rudder pedal 22 will now be described.

The method comprises providing a frame 28 as described above. The frame 28 is advantageously obtained from the manufacturing method described above.

The method further comprises providing at least one part of the rudder pedal 22.

The method then comprises, for each part of the rudder pedal 22, connecting the part to at least one of the connection interfaces 154A-154C of the frame 28.

As a result of the previously described features, the frame 28 meets the requirements defined above for the frame 28 alone. In particular, the frame 28 is sufficiently compact to meet the allocated footprint, and light enough to not exceed the mass allocation of the rudder pedal 22.

In addition, the frame 28 thus allows fixing to the floor of the aircraft 10 to improve mounting conditions and thus safety.

In the foregoing, it is clear to those skilled in the art that, for each pedal 32, the pedal 32 is connected to the support rod 54 by the braking pivotal link 110; and that the pedal 32 is able to be rotated relative to the support link 54 around the axis of rotation A9 passing through said braking pivot connection 110.

Moreover, in all the foregoing, for braking, when it is a question of a displacement of the pedal 32 with respect to the crank 48 around the axis of rotation A9, it is understood that it is also a question of a movement of the pedal 32 relative to the support link 54 around the axis of rotation A9.

In particular, the crank 48 and the support link 54 are able to be stationary with respect to each other, during the rotation of the pedal 32 with respect to the support link 54 and with respect to the crank 48 around the axis of rotation A9 passing through said braking pivotal link 110.

For example, the braking acquisition system 112 is configured to generate an electrical signal representative of a movement of the pedal 32 relative to the support link 54 around the axis of rotation A9.

What is claimed is:

1. A frame for a rudder pedal comprising:
   a base;
   a support framework; and
   connection interfaces, each connection interface being configured to connect another part of the rudder pedal to the frame,
   the support framework connecting each connection interface to the base, the support framework comprising framework elements arranged in a lattice, at least one of the framework elements extending from each connection interface,
   wherein the connection interfaces comprise at least four pedal interfaces divided into two distinct pairs of pedal interfaces, each pair corresponding to connection interfaces of a pedal articulated support structure of the rudder pedal, the two pairs being arranged on either side of a longitudinal median plane of the frame, each pair comprising a distal pedal interface and a proximal pedal interface.

2. The frame according to claim 1, wherein the base comprises at least two half bases, the two half bases being separate and spaced at a distance from each other, the half bases being arranged on either side of a longitudinal median plane of the frame.

3. The frame according to claim 1, wherein at least 50% of the framework elements are elongated.

4. The frame according to claim 1, wherein each connection interface is male or female, each connection interface being able to be inserted into a separate element or able to receive a separate element to connect the part of the rudder pedal associated with the frame, and/or wherein each connection interface comprises at least one attachment region, the attachment region delimiting at least one reception hole of a fixing member.

5. The frame according to claim 1, wherein the connection interfaces comprise at least one sensor interface corresponding to a connection interface of a yaw acquisition system of the rudder pedal configured to generate an electrical signal representative of a displacement of pedals of the rudder pedal relative to the frame, and wherein, for at least one of the pedal interfaces, one of the framework elements connects said pedal interface to the sensor interface by extending from said pedal interface to the sensor interface.

6. The frame according to claim 1, wherein the connection interfaces comprise at least one adjustment interface corresponding to an interface for connecting an ergonomic adjustment system of a position of use of pedals of the rudder pedal, and wherein the adjustment interface protrudes out of plumb from the base, the adjustment interface being connected to the base by at least two support framework elements able to transmit to the base a load carried by the adjustment interface.

7. The frame according to claim 1, wherein the support framework delimits a central functional passage, said central functional passage allowing the passage of at least one cylinder with a diameter greater than or equal to 100 mm.

8. A method for manufacturing the frame according to claim 1, comprising
   additive manufacturing of the support framework of the frame.

9. The frame according to claim 1, wherein the proximal pedal interface protrudes out of plumb from the base.

10. The frame according to claim 1, wherein the lattice comprises nodes of which, respectively, at least two of the framework elements cooperate, each framework elements extending along a guide line from one of the nodes, one of the connection interfaces or the base, to another of the nodes, another of the connection interfaces or the base.

11. The frame according to claim 10, wherein the framework elements of the support framework comprise support framework elements and bracing framework elements;
   each support framework elements extending along the guide line between two ends, and, for each connection interface, at least one of the support framework elements extending from the connection interface and transmitting a load from the connection interface to the base; and
   each bracing framework element cooperating with at least one of the support framework elements at a node arranged between the two ends of the support framework elements.

12. The frame according to claim 11, wherein the lattice comprises two side half lattices, the two side half lattices being respectively formed by a portion of the support framework elements and being arranged on opposite sides of a longitudinal median plane of the frame, the two side half lattices being laterally connected one to another by at least one of the bracing framework elements.

13. The frame according to claim 1, wherein the lattice comprises nodes of which, respectively, at least two of the framework elements cooperate; and, in the lattice, at least 50% of the nodes are distributed in a spatially symmetrical arrangement, wherein the spatially symmetrical arrangement presents a plane of symmetry.

14. The frame according to claim 13, wherein at least 75% of the nodes are distributed in the spatially symmetrical arrangement and/or wherein the plane of symmetry corresponds to a longitudinal median plane of the frame.

15. The frame according to claim 1, wherein the base, the connection interfaces, and the support framework are formed in one single part, an entirety of the base, the connection interfaces and the support framework being integrally formed from a predetermined material.

16. The frame according to claim 15, wherein the entire base, the connection interfaces and the support framework are formed by a superposition of layers of said predetermined material, and/or the predetermined material is aluminum or an aluminum alloy.

17. A frame for a rudder pedal comprising:
   a base;

a support framework; and connection interfaces, each connection interface being configured to connect another part of the rudder pedal to the frame, the support framework connecting each connection interface to the base, the support framework comprising framework elements arranged in a lattice, at least one of the framework elements extending from each connection interface, wherein the connection interfaces comprise at least two pedal interfaces, each pedal interface corresponding to a connection interface of a pedal articulated support structure of the rudder pedal, the two pedal interfaces being arranged on either side of a longitudinal median plane of the frame;

and wherein the connection interfaces comprise at least one sensor interface corresponding to a connection interface of a yaw acquisition system of the rudder pedal configured to generate an electrical signal representative of a displacement of pedals of the rudder pedal relative to the frame.

18. The frame according to claim 17, wherein, for at least one of the pedal interfaces, one of the framework elements connects said pedal interface to the sensor interface by extending from said pedal interface to the sensor interface.

19. A frame for a rudder pedal comprising:

a base;

a support framework; and connection interfaces, each connection interface being configured to connect another part of the rudder pedal to the frame, the support framework connecting each connection interface to the base, the support framework comprising framework elements arranged in a lattice, at least one of the framework elements extending from each connection interface, the connection interfaces comprising at least one adjustment interface corresponding to an interface for connecting an ergonomic adjustment system of a position of use of pedals of the rudder pedal, wherein the adjustment interface protrudes out of plumb from the base;

and/or the adjustment interface comprises a projecting portion able to be inserted in a part of the ergonomic adjustment system or a reception housing able to receive a part of the ergonomic adjustment system, the projecting portion or the reception housing extending transversally to a longitudinal median plane of the frame.

20. A frame for a rudder pedal comprising:

a base;

a support framework; and connection interfaces, each connection interface being configured to connect another part of the rudder pedal to the frame, the support framework connecting each connection interface to the base, the support framework comprising framework elements arranged in a lattice, at least one of the framework elements extending from each connection interface, wherein at least two of the framework elements extend from one of the connection interfaces out of the same plane; and wherein each framework element extends along a longitudinal from a first end to a second end and wherein at least one of the framework elements presents a variable transversal section and/or is curved along the longitudinal.

\* \* \* \* \*